United States Patent
Decoux et al.

(10) Patent No.: US 9,579,922 B2
(45) Date of Patent: Feb. 28, 2017

(54) MARKING COMPRISING A PRINTABLE CODE AND A CHIRAL LIQUID CRYSTAL POLYMER LAYER

(71) Applicant: SICPA HOLDING SA, Prilly (CH)

(72) Inventors: Eric Decoux, Vevey (CH); Tristan Jauzein, Lausanne (CH)

(73) Assignee: SICPA HOLDING SA, Prilly (CH)

( * ) Notice: Subject to any disclaimer, the term of this patent is extended or adjusted under 35 U.S.C. 154(b) by 262 days.

(21) Appl. No.: 14/326,982

(22) Filed: Jul. 9, 2014

(65) Prior Publication Data

US 2015/0014983 A1    Jan. 15, 2015

Related U.S. Application Data

(60) Provisional application No. 61/844,700, filed on Jul. 10, 2013.

(30) Foreign Application Priority Data

Jul. 19, 2013    (EP) .................... PCT/EP2013/065335

(51) Int. Cl.
*G06K 19/02* (2006.01)
*G06K 19/06* (2006.01)
(Continued)

(52) U.S. Cl.
CPC ............... *B42D 25/30* (2014.10); *B41M 3/14* (2013.01); *B42D 25/00* (2014.10); *B42D 25/415* (2014.10);
(Continued)

(58) Field of Classification Search
CPC .. B42D 25/364; B42D 2033/26; B42D 25/30; B42D 25/415; B42D 25/00;
(Continued)

(56) References Cited

U.S. PATENT DOCUMENTS 5,424,119 A * 6/1995 Phillips .................. B29C 41/24
264/108
5,766,738 A * 6/1998 Phillips .................. B05D 1/286
428/200

(Continued)

FOREIGN PATENT DOCUMENTS

EP    0 847 432    6/1998
EP    1669213    6/2006
(Continued)

OTHER PUBLICATIONS

English translation of Taiwanese Office Action and Search Report in respect to Taiwanese Application No. 103121944, mailed Sep. 25, 2015.
(Continued)

*Primary Examiner* — Claude J Brown
(74) *Attorney, Agent, or Firm* — Greenblum & Bernstein, P.L.C.

(57) ABSTRACT

Disclosed is a marking for an article, item or substrate. The marking comprises a printable code, at least a part of which is covered by a chiral liquid crystal polymer (CLCP) layer, and further preferably including an intermediate layer including a distribution of flakes, to provide readable information of at least two different types on the article.

25 Claims, 2 Drawing Sheets

(51) Int. Cl.
*B42D 25/30* (2014.01)
*B42D 25/415* (2014.01)
*B41M 3/14* (2006.01)
*C09K 19/38* (2006.01)
*G09F 3/00* (2006.01)
*B42D 25/00* (2014.01)
*C09K 19/04* (2006.01)
*C09K 19/34* (2006.01)

(52) U.S. Cl.
CPC ............... *C09K 19/38* (2013.01); *G09F 3/00* (2013.01); *G09F 3/0294* (2013.01); *C09K 2019/0448* (2013.01); *C09K 2019/3408* (2013.01)

(58) Field of Classification Search
CPC ...... G03H 2250/38; G02F 2001/13775; G02F 2201/343; G02F 1/1334; G02F 1/13476; G02F 1/13718; C09K 19/00; C09K 19/38; C09K 2019/0448; C09K 2019/3408; B41M 3/14; G09F 3/00; G09F 3/0294
USPC ........................................................ 235/494
See application file for complete search history.

(56) References Cited

U.S. PATENT DOCUMENTS

| | | | |
|---|---|---|---|
| 6,136,225 A | 10/2000 | Meyer et al. | |
| 6,589,445 B2 | 7/2003 | Sugiyama et al. | |
| 6,753,044 B2* | 6/2004 | Faris | B82Y 15/00 252/299.01 |
| 7,510,741 B2* | 3/2009 | Pokorny | G02B 5/3016 427/162 |
| 7,679,701 B2* | 3/2010 | Schadt | G02B 5/30 349/117 |
| 8,186,573 B2 | 5/2012 | Callegari et al. | |
| 8,426,011 B2 | 4/2013 | Tiller et al. | |
| 8,426,012 B2 | 4/2013 | Tiller et al. | |
| 8,426,013 B2 | 4/2013 | Tiller et al. | |
| 8,426,014 B2 | 4/2013 | Tiller et al. | |
| 2002/0005505 A1* | 1/2002 | Ferrand | C07C 69/734 252/299.61 |
| 2004/0241400 A1* | 12/2004 | Friedl | B42D 25/00 428/202 |
| 2006/0088667 A1* | 4/2006 | Iftime | C09K 19/52 428/1.1 |
| 2006/0262367 A1* | 11/2006 | Hattori | B41M 3/14 359/15 |
| 2007/0139744 A1* | 6/2007 | Argoitia | G03H 1/0011 359/2 |
| 2007/0195392 A1* | 8/2007 | Phillips | C09J 11/02 359/15 |
| 2007/0206249 A1* | 9/2007 | Phillips | B42D 25/00 359/2 |
| 2007/0224341 A1 | 9/2007 | Kuntz et al. | |
| 2007/0281177 A1* | 12/2007 | Haubrich | B41M 3/148 428/457 |
| 2008/0160226 A1* | 7/2008 | Kaule | D21H 1/44 428/29 |
| 2008/0261687 A1* | 10/2008 | Gatzios | A63F 1/02 463/29 |
| 2009/0230670 A1 | 9/2009 | Schmid et al. | |
| 2010/0045027 A1* | 2/2010 | Whiteman | B44F 1/10 283/107 |
| 2010/0200649 A1 | 8/2010 | Callegari et al. | |
| 2010/0307376 A1 | 12/2010 | Aboutanos et al. | |
| 2011/0101088 A1 | 5/2011 | Marguerettaz et al. | |
| 2011/0293899 A1 | 12/2011 | Tiller et al. | |
| 2011/0317271 A1* | 12/2011 | Dunn | G07D 7/0006 359/619 |
| 2012/0019738 A1* | 1/2012 | Cox | C09K 19/38 349/36 |
| 2012/0068450 A1* | 3/2012 | Macpherson | B44F 1/10 283/70 |
| 2012/0074684 A1* | 3/2012 | Marchant | B42D 25/00 283/85 |
| 2012/0141697 A1 | 6/2012 | Callegari et al. | |
| 2012/0141745 A1 | 6/2012 | Callegari et al. | |
| 2012/0211564 A1 | 8/2012 | Callegari et al. | |
| 2013/0038942 A1* | 2/2013 | Holmes | B42D 25/351 359/619 |
| 2013/0069003 A1 | 3/2013 | Marguerettaz et al. | |
| 2013/0099000 A1* | 4/2013 | Hoshino | G02B 5/3016 235/457 |
| 2013/0235322 A1 | 9/2013 | Callegari et al. | |
| 2013/0256415 A1 | 10/2013 | Callegari et al. | |
| 2013/0285361 A1* | 10/2013 | Staub | B42D 25/364 283/85 |
| 2014/0160540 A1* | 6/2014 | Hoshino | B32B 27/06 359/2 |

FOREIGN PATENT DOCUMENTS

| | | |
|---|---|---|
| GB | 2 330 139 | 6/2011 |
| JP | 2009-300662 | 12/2009 |
| WO | 93/22397 | 11/1993 |
| WO | 95/22586 | 8/1995 |
| WO | 97/00600 | 1/1997 |
| WO | 2001/024106 | 4/2001 |
| WO | 2007/060133 | 5/2007 |
| WO | 2008/000755 | 6/2007 |
| WO | 2008/127950 | 10/2008 |
| WO | 2008/128714 | 10/2008 |
| WO | 2010/115879 | 10/2010 |
| WO | 2011/069689 | 6/2011 |
| WO | 2011/069690 | 6/2011 |
| WO | 2011/069691 | 6/2011 |
| WO | 2011/069692 | 6/2011 |
| WO | 2012/076533 | 6/2012 |
| WO | 2012/076534 | 6/2012 |

OTHER PUBLICATIONS

J.L. Fergason, "Molecular Crystals", 1966, pp. 293-307, vol. 1.
International Search Report and Written Opinion of International Application No. PCT/EP2014/064596, dated Sep. 9, 2014.

* cited by examiner

MARKING COMPRISING A PRINTABLE CODE AND A CHIRAL LIQUID CRYSTAL POLYMER LAYER

CROSS-REFERENCE TO RELATED APPLICATIONS

This application claims the benefit of U.S. Provisional Application No. 61/844,700, filed Jul. 10, 2013, and of PCT Application No. PCT/EP2013/065335, filed Jul. 19, 2013, the disclosures of which are incorporated by reference herein in their entireties.

BACKGROUND OF THE INVENTION

1. Field of the Invention

The present invention relates to a marking on an article, item or substrate, which marking comprises at least two different components, i.e., a printable code and a chiral liquid crystal polymer layer that covers at least a part of the printable code.

2. Discussion of Background Information

Counterfeiting is no longer a national or a regional problem but a worldwide problem which has an impact not only on manufacturers but also on the consumer. Counterfeiting is a significant problem with goods like clothes and watches but becomes even more serious when it affects medicines and drugs. Each year thousands of people around the world die because of counterfeit drugs. Counterfeiting has also an impact on government revenues in that it affects the collection of taxes for, e.g., cigarettes and alcohol because of the existence of a black market where it is impossible to track and trace counterfeit (smuggled, diverted, etc.) products with no valid tax stamps.

Many solutions have been proposed to make counterfeiting impossible or at least very difficult and/or costly, for example RFID solutions and the use of invisible inks or mono-dimensional code or bi-dimensional code as unique identifier to avoid or at least to limit drastically the existence of fake, diversion and/or counterfeit. Despite the fact that these solutions are useful, also counterfeiters now have access to many advanced technologies that allow them to reproduce or to mimic existing security devices which are sometimes presented as unique identifier.

Another solution which also exists in the field of packaging or as a protection for items or goods and is mainly used for pharmaceuticals packaging are tamper evident structures or void tamper security evident structures which in themselves are not unique identifiers, but serve as indication when these structures have been altered that a manipulation of a packaging or an item or good has occurred. Despite the strong interest to see whether or not a packaging has been subject to manipulation, the main weaknesses of these structures are that they can be reproduced (even if it remains difficult) and their lack of uniqueness and ability to provide track and trace information.

There is then a crucial need to improve the security and avoid fake, diversion or counterfeiting of goods, items or packaging containing valuable products, which must be satisfied. There also is a crucial need to not only protect consumers from not obtaining genuine products, but very often as it could happen in some developing countries, to save people from health problems or even death due to the use of fake medicines. There is then a crucial need to be satisfied to provide unique identifiers useful for authentication, able to provide track and trace information or identification, remaining robust and having tamperproof properties.

SUMMARY OF THE INVENTION

The present invention provides a marking for an article, item or substrate which comprises a printable code. At least a part of the code is covered by a chiral or cholesteric liquid crystal polymer (CLCP) layer.

The present invention also provides a marking for an article, item or substrate, comprising a printable code, wherein at least a part of the code is covered by a transparent intermediate layer including randomly distributed therein at least one type of flakes comprising a CLCP material; and wherein the transparent intermediate layer is at least partially covered by a chiral liquid crystal polymer (CLCP) layer that also at least partially covers the printable code and preferably has at least one optical property that is different from an optical property of the CLCP material of the flakes. For example, the flakes may have an average size of from about 20 μm to about 100 μm and/or they may have an at least bimodal particle size distribution and/or they may be visible to the unaided eye and/or invisible to the unaided eye.

In one aspect of the marking, the printable code may be machine readable and/or digitally printable and/or the printable code may comprise one or more of cells, dots, microdots, bars, micro alphanumeric characters and glyphs and/or it may comprise one or more of a cloud of dots, a sum of glyphs, a 1-dimensional barcode, a stacked 1-dimensional barcode, a 2-dimensional barcode, and a data matrix.

In another aspect, the printable code may comprise (e.g., may have been formed with) a black ink. For example, the black ink may be or comprise a conventional black (e.g., printing) ink. It may also be or comprise an IR absorbent black ink and/or it may be or comprise an IR transparent black ink.

In yet another aspect of the marking of the present invention, at least a part of the printable code may be formed by an IR absorbent black ink and/or a conventional black ink and at least a part of the code that is formed by the IR absorbent black ink and/or conventional black ink may be covered by an IR transparent black ink and/or at least a part of the printable code formed by an IR absorbent black ink and/or a conventional black ink may be provided on a background formed by an IR transparent black ink.

In a still further aspect of the marking, the CLCP layer may be made from a precursor composition that comprises at least one nematic compound, at least one chiral dopant, at least one photoinitiator and, optionally, at least one solvent.

In another aspect of the marking, the CLCP layer may be visible to an unaided eye.

In yet another aspect, an optical property of the CLCP layer may have been modified in at least one part of the CLCP layer.

In a further aspect of the marking, the CLCP layer may have randomly distributed therein at least one type of flakes which comprise (e.g., are made of) at least one CLCP that has at least one optical property that is different from an optical property of the CLCP layer. For example, the flakes may have an average size of from about 20 μm to about 100 μm and/or they may have an at least bimodal particle size distribution and/or they may be visible to the unaided eye and/or invisible to the unaided eye.

In another aspect of the marking of the present invention, at least one (preferably transparent) intermediate layer may be present between the printable code and the CLCP layer, said at least one intermediate layer having randomly distributed therein at least one type of flakes which comprise (e.g., are made of) a CLCP that has at least one optical property that is different from an optical property of the CLCP layer. For example, the flakes may have an average size of from about 20 μm to about 100 μm and/or they may have an at least bimodal particle size distribution and/or at least a part thereof may be visible to the unaided eye and/or at least a part thereof may be invisible to the unaided eye. The at least one intermediate layer may comprise a UV cured resin.

The present invention also provides a substrate which has a marking according to the present invention as set forth above (including the various aspects thereof) on at least one surface thereof.

In one aspect of the substrate, at least one cured resin layer may be present between the substrate and the printable code, which resin layer modifies at least one optical property of the CLCP layer in areas thereof that are in direct contact with the CLCP layer, i.e., are not covered by ink of the printable code.

In another aspect of the substrate, a second CLCP layer may be present between the substrate and the printable code, the second CLCP layer having at least one optical property that is different from an optical property of the CLCP layer that covers at least a part of the printable code.

The present invention also provides an article or item that is marked with the marking according to the present invention as set forth above (including the various aspects thereof).

In one aspect, the article or item may be or may comprise at least one of a label, a packaging, a cartridge, a container or a capsule that contains foodstuffs, nutraceuticals, pharmaceuticals, or beverages, a banknote, a credit card, a stamp, a tax label, a security document, a passport, an identity card, a driver's license, an access card, a transportation ticket, an event ticket, a voucher, an ink-transfer layer, a reflective layer, an aluminum foil, a semiconductor, and a commercial good.

The present invention further provides a method of marking an article or item. The method comprises providing at least one surface of the article or item with a printable code, at least a part of which is covered by a CLCP layer.

The present invention also provides a method of marking an article or item, wherein the method comprises providing at least one surface of the article or item with a printable code, covering at least a part of the printable code with a transparent intermediate layer including randomly distributed therein at least one type of particles comprising a chiral liquid crystal polymer (CLCP) material; and at least partially covering the transparent intermediate layer with a CLCP layer that also at least partially covers the printable code.

The present invention further provides a method of identifying and/or authenticating and/or tracking and/or tracing an article or item. The method comprises providing the article or item with the marking according to the present invention as set forth above, retrieving information from at least the printable code of the marking and comparing the retrieved information with previously stored information. For example, the information may be retrieved by using the camera of a mobile phone (e.g., by scanning the code in the form of, for example, a data matrix).

The present invention also provides a method of at least one of identifying, authenticating and tracking and/or tracing an article or item, comprising retrieving information from at least the printable code of the marking on the article or item, and comparing the retrieved information with previously stored information.

The present invention further comprises a method of increasing the complexity and/or reducing the ease of reproduction of a printable code. The method comprises covering at least a part of the printable code with a CLCP layer.

BRIEF DESCRIPTION OF THE DRAWINGS

The present invention is further described in the detailed description which follows, in reference to the noted plurality of drawings by way of a non-limiting example of exemplary embodiment of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise. For example, reference to "a magnetic material" would also mean that mixtures of one or more magnetic materials can be present unless specifically excluded.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the disclosure of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The various embodiments disclosed herein can be used separately and in various combinations unless specifically stated to the contrary.

The marking of the present invention comprises at least a printable code and a CLCP layer (preferably continuous) that covers at least a part of (and preferably substantially the entire) printable code. Preferably, there is a distribution of flakes located between the printable code and the CLCP layer and/or within the CLCP layer.

Figure 1:
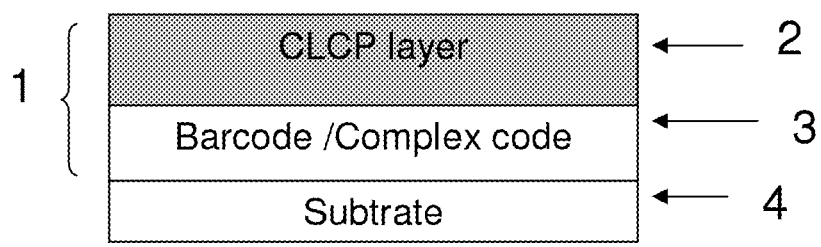
FIG. 1 shows an embodiment of the invention wherein a CLCP layer (2) is positioned over a printable code (3) (2) and (3) are constitutive of the marking (1) according to the present invention and located on a substrate (4)
Figure 2:
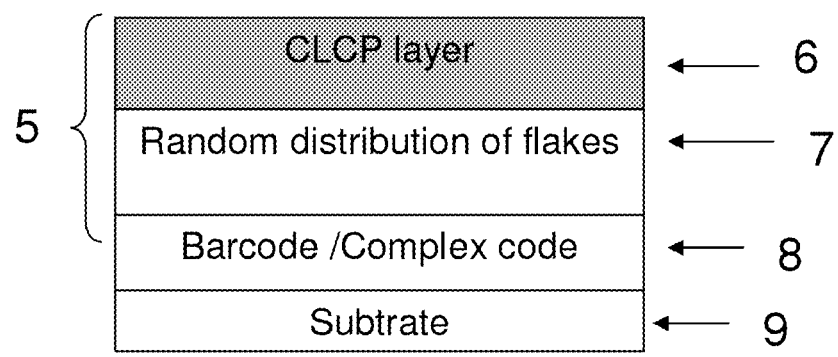
FIG. 2 shows an embodiment of the invention wherein there is an intermediate layer including a distribution of flakes (7) located between the CLCP layer (6) and the printable code (8) constitutive of the marking (5) according to the present invention located on a substrate.
Figure 3:
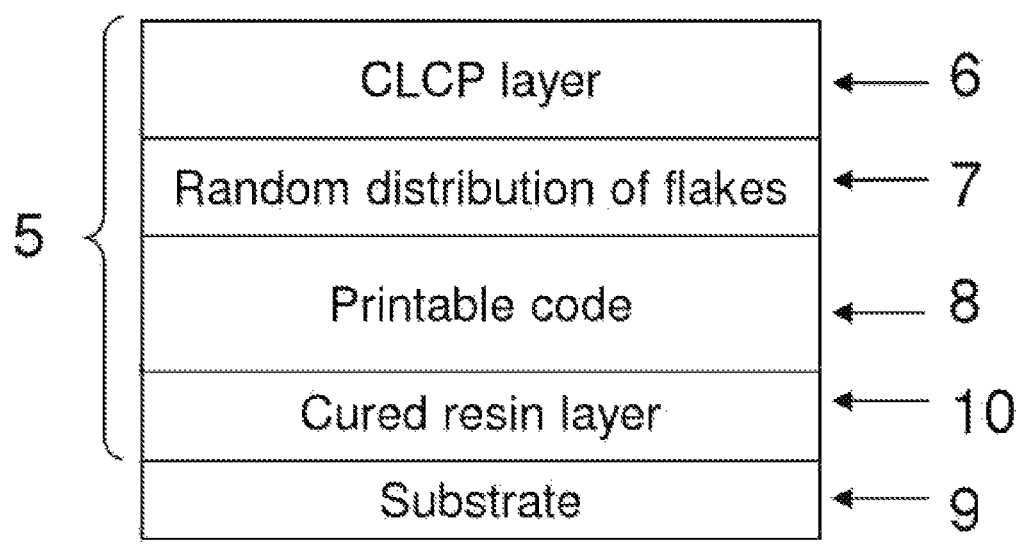
FIG. 3 shows an embodiment of the invention wherein there is a cured resin layer (10) between the substrate (9) and the printable code (8).

With reference to FIG. 1, it is seen that there can be a marking 1 on a substrate 4, the marking 1 including a printable code 3, and a CLCP layer 2. With reference to FIG. 2, it is seen that there can be a marking 5 on a substrate 9, the marking 5 including a printable code 8, a distribution of flakes layer 7 and a CLCP layer 6. Each of the CLCP layer and the distribution of flakes layer can at least partially overlap each other as well as the printable code. Moreover, there can be various additional layers included in the marking, such as without limitation, protective layers and various intermediate layers, such as modifying agent layers, such as at least one cured resin layer 10 may be present between the substrate 9 and the printable code 8, which resin layer modifies at least one optical property of the CLCP layer 6 in areas thereof that are not covered by ink of the printable code, additional distribution of flakes layers, such as a cured resin layer able to modify at least one optical properties of the CLCP layer, and layers that include various detectable elements.

The (preferably machine readable) printable code may have been produced by any known printing technique, including conventional printing and digital printing (e.g., by using a laser). For example, the printable code may be or comprise a digitally printed (or at least digitally printable) code. Further, the printable code may have been produced by two or more different printing methods. For example, a part of the code may have been produced by digital printing and another part of the code may have been produced by a conventional printing technique. The various printing methods are known to those of skill in the art and the suitability of a specific printing method depends on, inter alia, the complexity of the code to be produced. A preferred method for producing the code is ink-jet printing (for example, continuous ink-jet printing, drop-on-demand ink-jet printing, or valve-jet printing). The industrial ink-jet printers, commonly used for numbering, coding and marking applications on conditioning lines and printing presses, are particularly suitable for this purpose. Preferred ink-jet printers include single nozzle continuous ink-jet printers (also called raster or multi level deflected printers) and drop-on-demand ink-jet printers, in particular valve-jet printers. Other conventional printing methods such as, for example, offset, rotogravure, screen printing, letterpress, flexography, intaglio, etc. may also be used and are known to those of skill in the art.

The code may, for example, comprise cells, dots, microdots, bars, micro alphanumeric characters, glyphs, or any combination of two or more thereof. The code may comprise, e.g., a cloud of dots, a sum of glyphs, a 1-dimensional barcode, a stacked 1-dimensional barcode, a 2-dimensional barcode, a data matrix, or any combination of two or more thereof. Merely by way of example, the printable code may consist of or comprise a cloud of dots and glyphs. In this case, the cloud of dots and the glyphs may have been produced by the same printing device or they may have been produced by different printing devices. Likewise, the cloud of dots and the glyphs may be readable by one (e.g., all-in-one) device, or they may be readable by two different devices.

Non-limiting examples of designs which are suitable as the printable code of the marking of the present invention include microdots, microtaggants, micromarkings, and micro alphanumeric characters. Further non-limiting examples of types of designs which are suitable for use in the present invention include clouds of dots. The clouds of dots may be in the form of, for example, distributions of particles or flakes where their distribution is determined by a mathematical algorithm. They may be printed with a very high resolution that renders them difficult to reproduce. Another type of cloud of dots that is suitable for use in the present invention is represented by sums of glyphs which represent a code having a unique auto-ID. The glyphs can take arbitrary shapes and forms. For example, the glyphs may be in the form of micro 45° diagonal lines (preferably invisible to the unaided eye) and their orientation in one or the other direction may correspond to 0 or 1 in a binary code, whereby a sum of glyphs which individually are oriented in a specific manner can represent a specific code and can provide data or information. Yet another non-limiting type of cloud of dots is represented by tags on a surface having an optically readable pattern. Each tag has a background pattern that defines a discrete area. The background pattern is common to all tags. Each tag further has coded data positioned within the discrete areas. The coded data is represented by a plurality of optically readable marks positioned according to an encoding scheme. The background pattern is distinguishable from the coded data.

The printable code or at least one or more parts thereof may be formed with a black ink such as conventional carbon black ink. Of course, inks of a different color may be used as well, although black is preferred because it makes the reflection color of the CLCP layer covering the code more visible. In particular, a black background absorbs light of all wavelengths for which the CLCP layer is transparent, whereby the light reflected by the CLCP layer can be observed without reflected/diffused light of other wavelengths. The ink may also be an invisible ink with a $\lambda$max or a $\lambda$max range of a specific absorption or emission wavelength.

The black ink may, for example, be a conventional carbon black ink as it commonly is used for printing, for example, newspapers, magazines, and the like. The black ink may further be an IR absorbent ink (i.e., an ink that absorbs IR radiation) that provides a hidden code (i.e., hidden information) that is detectable (readable) only with the aid of a light source that emits radiation in the IR range. By the same token, the black ink may be an IR transparent ink (i.e., a black ink that lets IR radiation pass through). All of these types of inks are readily commercially available. Of course, the printable code may be made by two or more different inks. Merely by way of example, a part of the code may be produced (e.g., printed) with an IR absorbent ink and another part of the code may be produced with an IR transparent ink.

Further, where at least a part of the printable code has been formed by an IR absorbent black ink and/or a conventional carbon black ink it may be advantageous to cover (e.g., overprint) the IR absorbent black ink/conventional black ink or at least one or more parts thereof with a black IR transparent ink, for example, in the form of a logo, a pattern, a square, etc. to provide hidden information (i.e., information that is invisible to the unaided eye). Conversely, an IR transparent black ink may be used for forming a black background on the substrate on which the printable code is provided (e.g., by ink-jet printing) with an IR absorbent black ink and/or a conventional black ink.

The CLCP layer of the present invention is obtainable, for example, by applying a CLCP precursor composition onto the printable code (carried by a temporary or permanent support) or at least a part thereof, optionally heating the applied CLCP precursor composition to promote the chiral liquid crystal state thereof, and curing the precursor composition in the chiral liquid crystal state to form the CLCP layer.

The CLCP precursor composition for making the layer may comprise at least one nematic compound, at least one chiral dopant, at least one photoinitiator and, optionally, at least one solvent. Non-limiting examples of corresponding compositions are disclosed in, for example, WO 2008/000755, WO 2010/115879, WO 2011/069689, WO 2011/069690, WO 2011/069691, and WO 2011/069692.

By way of background, cholesteric (chiral) liquid crystals exhibit a viewing-angle dependent color. When illuminated with white light the cholesteric liquid crystal structure reflects light of a predetermined color (predetermined wavelength range) which is a function of the employed materials and generally varies with the angle of observation and the device. The precursor material itself is colorless and the observed color (predetermined wavelength range) is only due to a physical reflection effect at the cholesteric helical structure adopted at a given temperature by the liquid crystal material (cf. J. L. Fergason, Molecular Crystals, Vol. 1, pp. 293-307 (1966), the entire disclosure whereof is incorporated by reference herein). In particular, in liquid crystal materials the cholesteric helical structure is "frozen" in a predetermined state through polymerization and thus rendered temperature-independent.

The chiral nematic liquid crystal phase is typically composed of nematic mesogenic molecules which comprise a chiral dopant that produces intermolecular forces that favor alignment between molecules at a slight angle to one another. The result thereof is the formation of a structure which can be visualized as a stack of very thin 2-D nematic-like layers with the director in each layer twisted with respect to those above and below. An important characteristic of the chiral nematic liquid crystal phase is the pitch p. The pitch p is defined as the (vertical) distance it takes for the director to rotate one full turn in the helix.

A characteristic property of the helical structure of the chiral nematic phase is its ability to selectively reflect light whose wavelength falls within a specific range. When this range overlaps with a portion of the visible spectrum a colored reflection will be perceived by an observer. The center of the range is approximately equal to the pitch multiplied by the average refractive index of the material. One parameter which has an influence on the pitch is the temperature because of the dependence thereon of the gradual change in director orientation between successive layers which modifies the pitch length, resulting in an alteration of the wavelength of reflected light as a function of the temperature.

A non-limiting example of a CLCP precursor composition that is suitable for making the marking of the present invention comprises (A) from 20% to 99.5% by weight, based on the total weight of the composition, of at least one three-dimensionally crosslinkable nematic compound of formula $$Y^1\text{-}A^1\text{-}M^1\text{-}A^2\text{-}Y^2$$

wherein
$Y^1$, $Y^2$ are equal or different, and represent polymerizable groups;
$A^1$, $A^2$ are equal or different residues of the general formula $C_nH_{2n}$, wherein n is 0 or an integer of from 1 to 20, and wherein at least one methylene group may be replaced by an oxygen atom;
$M^1$ is of formula $-R^1-X^1-R^2-X^2-R^3-X^3-R^4-$
wherein
$R^1$ to $R^4$ are equal or different bivalent residues selected from $-O-$, $-COO-$, $-COHN-$, $-CO-$, $-S-$, $-C\equiv C-$, $CH=CH-$, $-N=N-$, $-N=N(O)-$, and a $C-C$ bond; and $R^2-X^2-R^3$ or $R^2-X^2$ or $R^2-X^2-R^3-X^3$ may as well be a $C-C$ bond;
$X^1$ to $X^3$ are equal or different residues selected from 1,4-phenylene; 1,4-cyclohexylene; heteroarylenes having from 6 to 10 atoms in the aryl core, 1 to 3 of which are heteroatoms selected from O, N, and S, and carrying substituents $B^1$, $B^2$ and/or $B^3$; cycloalkylenes having from 3 to 10 carbon atoms and carrying substituents $B^1$, $B^2$ and/or $B^3$;
wherein
$B^1$ to $B^3$ are equal or different substituents selected from hydrogen, $C_1$-$C_{20}$-alkoxy, $C_1$-$C_{20}$-alkylthio, $C_1$-$C_{20}$-alkylcarbonyl, alkoxycarbonyl, $C_1$-$C_{20}$-alkylthiocarbonyl, $-OH$, $-F$, $-Cl$, $-Br$, $-I$, $-CN$, $-NO_2$, formyl, acetyl, and alkyl-, alkoxy-, or alkylthio-residues with 1 to 20 carbon atoms having a chain interrupted by ether oxygen, thioether, sulfur or ester groups; and
(B) from 0.5% to 80% by weight, based on the total weight of the composition, of at least one chiral compound of the formula $$V^1\text{-}A^1\text{-}W^1-Z-W^2\text{-}A^2\text{-}V^2$$

wherein
$V^1$, $V^2$ are equal or different and represent a residue of the following: acrylate, methacrylate, epoxy, vinyl ether, vinyl, isocyanate, $C_1$-$C_{20}$-alkyl, $C_1$-$C_{20}$-alkoxy, alkylthio, $C_1$-$C_{20}$-alkylcarbonyl, $C_1$-$C_{20}$-alkoxycarbonyl, $C_1$-$C_{20}$-alkylthiocarbonyl, $-OH$, $-F$, $-Cl$, $-Br$, $-I$, CN, $-NO_2$, formyl, acetyl, as well as alkyl-, alkoxy-, or alkylthio-residues with 1 to 20 carbon atoms having a chain interrupted by ether oxygen, thioether sulfur or ester groups, or a cholesterol residue;
$A^1$, $A^2$ are as indicated above;
$W^1$, $W^2$ are of formula $-R^1-X^1-R^2-X^2-R^3-$
wherein
$R^1$ to $R^3$ are as indicated above, and wherein $R^2$ or $R^2-X^2$ or $X^1-R^2-X^2-R^3$ may also be a $C-C$ bond;
$X^1$, $X^2$ are as indicated above;
Z is a divalent chiral residue chosen from dianhydrohexites, hexoses, pentoses, binaphthyl derivatives, biphenyl derivatives, derivatives of tartaric acid, and optically active glycols, and a $C-C$ bond in the case where $V^1$ or $V^2$ is a cholesterol residue.

Component (B) can, for example, be selected from one or more of (2-[4-(acryloyloxy)-benzoyl]-5-(4-methoxybenzoyl)-isosorbide), (di-2,5-[4-(acryloloxy)-benzoyl]-isosorbide), and (di-2,5[(4'-acryloyloxy)-benzoyl]-isomannide).

The precursor composition for making the CLCP layer of the marking of the present invention preferably comprises a mixture of (i) one or more nematic compounds A and (ii) one or more cholesteric (i.e., chiral dopant) compounds B (including cholesterol) which are capable of giving rise to a cholesteric state of the composition. The pitch of the obtainable cholesteric state depends on the relative ratio of the nematic and the cholesteric compounds. Typically, the (total) concentration of the one or more nematic compounds A in the chiral liquid crystal precursor composition for use in the present invention will be four to thirty times the (total) concentration of the one or more cholesteric compounds B. Generally, a precursor composition with a high concentration of cholesteric compounds is not desirable (although possible in many cases) because the one or more cholesteric compounds tend to crystallize, thereby making it impossible to obtain the desired liquid crystal state having specific optical properties.

Nematic compounds A which are suitable for use in the chiral liquid crystal precursor composition for making the CLCP layer of the marking of the present invention are known in the art; when used alone (i.e., without cholesteric compounds) they arrange themselves in a state characterized by its birefringence. Non-limiting examples of nematic compounds A which are suitable for use in the present invention are described in, e.g., WO 93/22397, WO 95/22586, EP-B-0 847 432, U.S. Pat. No. 6,589,445, US 2007/0224341 A1 and JP 2009-300662 A.

A preferred class of nematic compounds for use in the present invention comprises one or more (e.g., 1, 2 or 3) polymerizable groups, identical or different from each other, per molecule. Examples of polymerizable groups include groups which are capable of taking part in a free radical polymerization and in particular, groups comprising a carbon-carbon double or triple bond such as, e.g., an acrylate moiety, a vinyl moiety or an acetylenic moiety. Particularly preferred as polymerizable groups are acrylate moieties.

The nematic compounds for use in the CLCP precursor composition further may comprise one or more (e.g., 1, 2, 3, 4, 5 or 6) optionally substituted aromatic groups, preferably phenyl groups. Examples of the optional substituents of the aromatic groups include those which are set forth herein as examples of substituent groups on the phenyl rings of the chiral dopant compounds of formula (I) such as, e.g., alkyl and alkoxy groups.

Examples of groups which may optionally be present to link the polymerizable groups and the aryl (e.g., phenyl) groups in the nematic compounds A include those which are exemplified herein for the chiral dopant compounds B of formula (I) (including those of formula (IA) and formula (IB) set forth below). For example, the nematic compounds A may comprise one or more groups of formulae (i) to (iii) which are indicated above as meanings for $A_1$ and $A_2$ in formula (I) (and formulae (IA) and (IB)), typically bonded to optionally substituted phenyl groups. Non-limiting specific examples of nematic compounds which are suitable for use in the present invention include 2-methoxybenzene-1,4-diyl bis[4-({[4-(acryloyloxy)butoxy]carbonyl}oxy)benzoate];

4-{[4-({[4-(acryloyloxy)butoxy]carbonyl}oxy)benzoyl]oxy}-2-methoxyphenyl 4-({[4-(acryloyloxy)butoxy]carbonyl}oxy)-2-methylbenzoate;

2-methoxybenzene-1,4-diyl bis[4-({[4-(acryloyloxy)butoxy]carbonyl}oxy)-2-methyl-benzoate];

2-methylbenzene-1,4-diyl bis[4-({[4-(acryloyloxy)butoxy]carbonyl}oxy)-2-methyl-benzoate];

4-{[4-({[4-(acryloyloxy)butoxy]carbonyl}oxy)benzoyl]oxy}-2-methylphenyl 4-({[4-(acryloyloxy)butoxy]carbonyl}oxy)-3-methoxybenzoate;

2-methylbenzene-1,4-diyl bis[4-({[4-(acryloyloxy)butoxy]carbonyl}oxy)benzoate];

2-methylbenzene-1,4-diyl bis[4-({[4-(acryloyloxy)butoxy]carbonyl}oxy)-3-methoxy-benzoate];

4-{[4-({[4-(acryloyloxy)butoxy]carbonyl}oxy)-3-methoxybenzoyl]oxy}-2-methylphenyl 4-({[4-(acryloyloxy)butoxy]carbonyl}oxy)-3,5-dimethoxybenzoate;

2-methylbenzene-1,4-diyl bis[4-({[4-(acryloyloxy)butoxy]carbonyl}oxy)-3,5-dimethoxy-benzoate];

2-methoxybenzene-1,4-diyl bis[4-({[4-(acryloyloxy)butoxy]carbonyl}oxy)-3,5-dimethoxybenzoate];

4-{[4-({[4-(acryloyloxy)butoxy]carbonyl}oxy)-3-methoxybenzoyl]oxy}-2-methoxyphenyl 4-({[4-(acryloyloxy)butoxy]carbonyl}oxy)-3,5-dimethoxybenzoate;

4-({4-[4-(acryloyloxy)butoxy]benzoyl}oxy)-3-methylphenyl 4-[4-(acryloyloxy)butoxy]-2-methylbenzoate;

4-({4-[4-(acryloyloxy)butoxy]benzoyl}oxy)-3-methylphenyl 4-[4-(acryloyloxy)butoxy]-3-methylbenzoate;

2-methylbenzene-1,4-diyl bis{4-[4-(acryloyloxy)butoxy]-2-methylbenzoate};

4-({4-[4-(acryloyloxy)butoxy]-2-methylbenzoyl}oxy)-3-methylphenyl 4-[4-(acryloyl-oxy)butoxy]-2,5-dimethylbenzoate;

2-methylbenzene-1,4-diyl bis{4-[4-(acryloyloxy)butoxy]-2,5-dimethylbenzoate}2-methylbenzene-1,4-diyl bis{4-[4-(acryloyloxy)butoxy]benzoate};

4-({4-[4-(acryloyloxy)butoxy]-3,5-dimethylbenzoyl}oxy)-3-methylphenyl 4-[4-(acryloyloxy)butoxy]-2,5-dimethylbenzoate;

2-methylbenzene-1,4-diyl bis{4-[4-(acryloyloxy)butoxy]-3,5-dimethylbenzoate};

2-methoxybenzene-1,4-diyl bis{4-[4-(acryloyloxy)butoxy]-3,5-dimethylbenzoate};

4-({4-[4-(acryloyloxy)butoxy]-3-methylbenzoyl}oxy)-2-methoxyphenyl 4-[4-(acryloyl-oxy)butoxy]-3,5-dimethylbenzoate;

2-methoxybenzene-1,4-diyl bis{4-[4-(acryloyloxy)butoxy]-3-methylbenzoate};

4-({4-[4-(acryloyloxy)butoxy]benzoyl}oxy)-3-methoxyphenyl 4-[4-(acryloyloxy)-butoxy]-3-methylbenzoate;

4-({4-[4-(acryloyloxy)butoxy]benzoyl}oxy)-3-methoxyphenyl 4-[4-(acryloyloxy)-butoxy]-2,5-dimethylbenzoate;

2-methoxybenzene-1,4-diyl bis{4-[4-(acryloyloxy)butoxy]-2-methoxybenzoate};

2-methoxybenzene-1,4-diyl bis{4-[4-(acryloyloxy)butoxy]-3,5-dimethoxybenzoate};

2-methoxybenzene-1,4-diyl bis{4-[4-(acryloyloxy)butoxy]-3-methoxybenzoate};

2-ethoxybenzene-1,4-diyl bis{4-[4-(acryloyloxy)butoxy]benzoate};

2-ethoxybenzene-1,4-diyl bis{4-[4-(acryloyloxy)butoxy]-2-methylbenzoate};

2-(propan-2-yloxy)benzene-1,4-diyl bis{4-[4-(acryloyloxy)butoxy]benzoate};

4-({4-[4-(acryloyloxy)butoxy]benzoyl}oxy)-2-(propan-2-yloxy)phenyl 4-[4-(acryloyl-oxy)butoxy]-2-methylbenzoate;

2-(propan-2-yloxy)benzene-1,4-diyl bis{4-[4-(acryloyloxy)butoxy]-2-methylbenzoate};

2-(propan-2-yloxy)benzene-1,4-diyl bis{4-[4-(acryloyloxy)butoxy]-2,5-dimethyl-benzoate};

2-(propan-2-yloxy)benzene-1,4-diyl bis{4-[4-(acryloyloxy)butoxy]-3,5-dimethyl-benzoate}; and 2-(propan-2-yloxy)benzene-1,4-diyl bis{4-[4-(acryloyloxy)butoxy]-3,5-dimethoxy-benzoate}.

The one or more cholesteric (i.e., chiral dopant) compounds B for use in the CLCP precursor composition preferably comprise at least one polymerizable group.

Suitable examples of the one or more chiral dopant compounds B include those of formula (I):

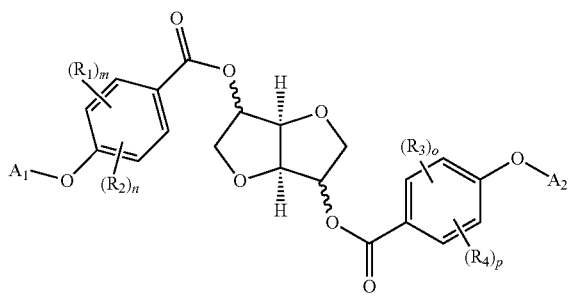

(I)

wherein:
$R_1, R_2, R_3, R_4, R_5, R_6, R_7$ and $R_8$ each independently denote $C_1$-$C_6$ alkyl and $C_1$-$C_6$ alkoxy;
$A_1$ and $A_2$ each independently denote a group of formula (i) to (iii):

—[(CH$_2$)$_y$-O]$_z$—C(O)—CH=CH$_2$;      (i)

—C(O)-D$_1$-O—[(CH$_2$)$_y$—O]$_z$—C(O)—CH=CH$_2$;      (ii)

—C(O)-D$_2$-O—[(CH$_2$)$_y$—O]$_z$—C(O)—CH=CH$_2$;      (iii)

$D_1$ denotes a group of formula

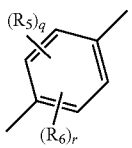

$D_2$ denotes a group of formula

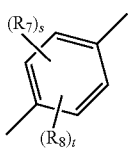

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one embodiment, the one or more chiral dopant compounds B may comprise one or more isomannide derivatives of formula (IA):

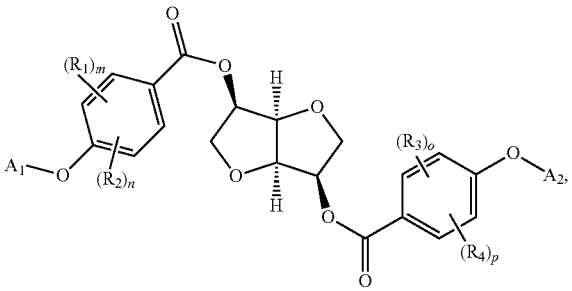

(IA)

wherein:
$R_1, R_2, R_3, R_4, R_5, R_6, R_7$ and $R_8$ each independently denote $C_1$-$C_6$ alkyl and $C_1$-$C_6$ alkoxy;
$A_1$ and $A_2$ each independently denote a group of formula (i) to (iii):

—[(CH$_2$)$_z$-O]$_z$-C(O)—CH=CH$_2$;      (i)

—C(O)-D$_1$-O—[(CH$_2$)$_y$-O]$_z$-C(O)—CH=CH$_2$;      (ii)

—C(O)-D$_2$-O—[(CH$_2$)$_y$-O]$_z$-C(O)—CH=CH$_2$;      (iii)

$D_1$ denotes a group of formula

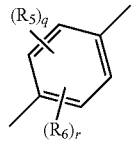

$D_2$ denotes a group of formula

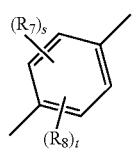

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one embodiment of the compounds of formula (IA) (and of compounds of formula (I)), $R_1, R_2, R_3, R_4, R_5, R_6, R_7$ and $R_8$ each independently denote $C_1$-$C_6$ alkyl. In an alternative embodiment, $R_1, R_2, R_3, R_4, R_5, R_6, R_7$ and $R_8$ in formula (IA) (and in formula (I)) each independently denote $C_1$-$C_6$ alkoxy.

In another embodiment of the compounds of formula (I) and of formula (IA), $A_1$ and $A_2$ each independently denote a group of formula —[(CH$_2$)$_y$—O]$_z$—C(O)—CH=CH$_2$; $R_1, R_2, R_3$ and $R_4$ each independently denote $C_1$-$C_6$ alkyl; and m, n, o, and p each independently denote 0, 1, or 2. In yet another embodiment, $A_1$ and $A_2$ in formula (I) and formula (IA) each independently denote a group of formula —[(CH$_2$)$_y$—O]$_z$—C(O)—CH=CH$_2$; $R_1, R_2, R_3$ and $R_4$ each independently denote $C_1$-$C_6$ alkoxy; and m, n, o, and p each independently denote 0, 1, or 2.

In another embodiment of the compounds of formula (IA) (and of formula (I)), $A_1$ and $A_2$ each independently denote a group of formula —C(O)-$D_1$-O—[(CH$_2$)$_y$—O]$_z$—C(O)—CH=CH$_2$ and/or of formula —C(O)-$D_2$-O—[(CH$_2$)$_y$—O]$_z$—C(O)—CH=CH$_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IA) (and in formula (I)) each independently denote a group of formula —C(O)-$D_1$-O—[(CH$_2$)$_y$—O]$_z$—C(O)—CH=CH$_2$ and/or a group of formula —C(O)-$D_2$-O—[(CH$_2$)$_y$—O]$_z$—C(O)—CH=CH$_2$; and $R_1$, $R_2$, $R_3$, $R_4$, $R_5$, $R_6$, $R_7$ and $R_8$ each independently denote $C_1$-$C_6$ alkoxy.

In another embodiment, the one or more chiral dopant compounds B may comprise one or more isosorbide derivatives represented by formula (IB):

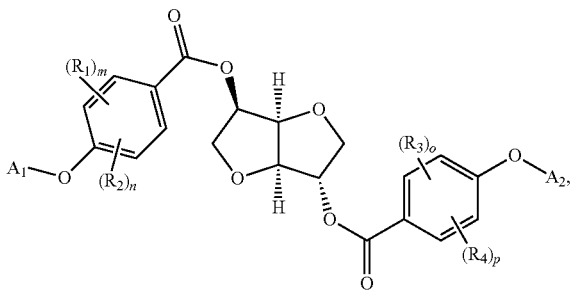

(IB)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;
$A_1$ and $A_2$ each independently denote a group of formula (i) to (iii):

—[(CH$_2$)y-O]z-C(O)—CH=CH$_2$;  (i)

—C(O)-$D_1$-O—[(CH$_2$)y-O]z-C(O)—CH=CH$_2$;  (ii)

—C(O)-$D_2$-O—[(CH$_2$)y-O]z-C(O)—CH=CH$_2$;  (iii)

$D_1$ denotes a group of formula

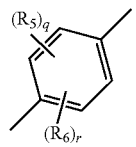

$D_2$ denotes a group of formula

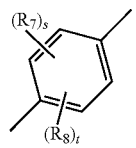

m, n, o, p, q, r, s, and t each independently denote 0, 1, or 2;
y denotes 0, 1, 2, 3, 4, 5, or 6;
z equals 0 if y equals 0 and z equals 1 if y equals 1 to 6.

In one embodiment of the compounds of formula (IB), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formula (IB) each independently denote $C_1$-$C_6$ alkoxy.

In another embodiment of the compounds of formula (IB), $A_1$ and $A_2$ each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (IB) each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IB), $A_1$ and $A_2$ each independently denote a group of formula —C(O)-$D_1$-O—[(CH$_2$)$_y$—O]$_z$—C(O)—CH=CH$_2$ and/or of formula —C(O)-$D_2$-O—[(CH$_2$)$_y$—O]$_z$—C(O)—CH=CH$_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IB) each independently denote a group of formula —C(O)-$D_1$-O—[(CH$_2$)$_y$—O]$_z$—C(O)—CH=CH$_2$ and/or a group of formula —C(O)-$D_2$-O—[(CH$_2$)$_y$—O]$_z$—C(O)—CH=CH$_2$; and $R_1$, $R_2$, $R_3$, $R_4$, $R_5$, $R_6$, $R_7$ and $R_8$ each independently denote $C_1$-$C_6$ alkoxy.

In a preferred embodiment, the alkyl and alkoxy groups of $R_1$, $R_2$, $R_3$, $R_4$, $R_5$, $R_6$, $R_7$ and $R_8$ in formulae (I), (IA) and (IB) may comprise 3, 4, 6 or 7 carbon atoms and in particular, 4 or 6 carbon atoms.

Examples of alkyl groups comprising 3 or 4 carbon atoms include isopropyl and butyl. Examples of alkyl groups comprising 6 or 7 carbon atoms include hexyl, 2-methylpentyl, 3-methylpentyl, 2,2-dimethylpentyl, and 2,3-dimethylpentyl.

Examples of alkoxy groups comprising 3 or 4 carbon atoms include isopropoxy, but-1-oxy, but-2-oxy, and tert-butoxy. Examples of alkoxy groups comprising 6 or 7 carbon atoms include hex-1-oxy, hex-2-oxy, hex-3-oxy, 2-methylpent-1-oxy, 2-methylpent-2-oxy, 2-methylpent-3-oxy, 2-methylpent-4-oxy, 4-methylpent-1-oxy, 3-methylpent-1-oxy, 3-methylpent-2-oxy, 3-methylpent-3-oxy, 2,2-dimethylpent-1-oxy, 2,2-dimethylpent-3-oxy, 2,2-dimethylpent-4-oxy, 4,4-dimethylpent-1-oxy, 2,3-dimethylpent-1-oxy, 2,3-dimethylpent-2-oxy, 2,3-dimethylpent-3-oxy, 2,3-dimethylpent-4-oxy, and 3,4-dimethylpent-1-oxy.

Non-limiting specific examples of chiral dopant compounds B of formula (I) which are suitable for use in the present invention include (3R,3aR,6R,6aR)-hexahydrofuro[3,2-b]furan-3,6-diyl bis(4-(4-(acryloyloxy)-3-methoxybenzoyloxy)-3-methoxy-benzoate);

(3R,3aR,6R,6aR)-6-(4-(4-(acryloyloxy)-3-methoxybenzoyloxy)-3-methoxybenzoyloxy)-hexahydrofuro[3,2-b]furan-3-yl 4-(4-(acryloyloxy)benzoyloxy)-3-methoxybenzoate;

(3R,3 aR,6R,6aR)-hexahydrofuro[3,2-b]furan-3,6-diyl bis(4-(4-(acryloyloxy)benzoyloxy)-benzoate);

(3R,3aR,6R,6aR)-hexahydrofuro[3,2-b]furan-3,6-diyl bis(4-(4-(acryloyloxy)butoxy)-benzoate);

(3R,3aR,6R,6aR)-hexahydrofuro[3,2-b]furan-3,6-diyl bis(4-(acryloyloxy)-2-methyl-benzoate);

(3R,3aR,6S,6aR)-hexahydrofuro[3,2-b]furan-3,6-diyl bis(4-(4-(acryloyloxy)benzoyloxy)-3-methoxybenzoate);

(3R,3 aR,6R,6aR)-hexahydrofuro[3,2-b]furan-3,6-diyl bis (4-(4-(acryloyloxy)-3-methoxy-benzoyloxy)benzoate);

(3R,3aR,6R,6aR)-hexahydrofuro[3,2-b]furan-3,6-diyl bis(4-(4-(acryloyloxy)benzoyloxy)-3-methoxybenzoate);

2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-mannitol;

2,5-bis-O-(4-{[4-(acryloyloxy)benzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-mannitol;

2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol 2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-mannitol;

2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-mannitol;

2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-mannitol;

2,5-bis-O-(4-{[4-(acryloyloxy)benzoyl]oxy}-3-methoxybenzoyl)-1,4:3,6-dianhydro-D-mannitol;

2-O-(4-{[4-(acryloyloxy)-2-methoxybenzoyl]oxy}-2,5-dimethylbenzoyl)-5-O-(4-{[14-(acryloyloxy)-3-methoxybenzoyl]oxy}-3-methylbenzoyl)-1,4:3,6-dianhydro-D-mannitol;

2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-mannitol;

2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-mannitol;

2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-mannitol;

2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-mannitol;

2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-mannitol;

2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-mannitol;

2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-mannitol;

2,5-bis-O-(4-{[4-(acryloyloxy)-2,5-dimethylbenzoyl]oxy}-2-ethoxybenzoyl)-1,4:3,6-dianhydro-D-mannitol;

2,5-bis-O-(4-{[4-(acryloyloxy)-2-ethoxybenzoyl]oxy}-2-ethoxybenzoyl)-1,4:3,6-dianhydro-D-mannitol;

2,5-bis-O-(4-{[4-(acryloyloxy)-2-methoxybenzoyl]oxy}-2-ethoxybenzoyl)-1,4:3,6-dianhydro-D-mannitol;

2,5-bis-O-(4-{[4-(acryloyloxy)-2-ethoxybenzoyl]oxy}-2-methoxybenzoyl)-1,4:3,6-dianhydro-D-mannitol;

2,5-bis-O-(4-{[4-(acryloyloxy)-2-ethoxybenzoyl]oxy}-3-methylbenzoyl)-1,4:3,6-dianhydro-D-mannitol;

2,5-bis-O-(4-{[4-(acryloyloxy)-2-ethoxybenzoyl]oxy}-3-methoxybenzoyl)-1,4:3,6-dianhydro-D-mannitol;

2,5-bis-O-(4-{[4-(acryloyloxy)-3-methoxybenzoyl]oxy}-3-methoxybenzoyl)-1,4:3,6-dianhydro-D-mannitol;

2,5-bis-O-(4-{[4-(acryloyloxy)-3-methoxybenzoyl]oxy}-3-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-benzoyl]oxy}-3-methoxybenzoyl)-1,4:3,6-dianhydro-D-glucitol;

2,5-bis-O-(4-{[4-(acryloyloxy)benzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-2-methylbenzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)benzoyl]oxy}-2-methoxybenzoyl)-5-O-(4-{[4-(acryloyloxy)-2,5-dimethylbenzoyl]oxy}-2-methoxybenzoyl)-1,4:3,6-dianhydro-D-glucitol;

2-O-(4-{[4-(acryloyloxy)-2,5-dimethylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)-2-methoxy-5-methylbenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2-O-(4-{[4-(acryloyloxy)-2-methoxybenzoyl]oxy}-2-methoxybenzoyl)-5-O-(4-{[4-(acryloyloxy)-3-methylbenzoyl]oxy}-2-methoxybenzoyl)-1,4:3,6-dianhydro-D-glucitol;

2,5-bis-O-(4-{[4-(acryloyloxy)benzoyl]oxy}-3-methoxybenzoyl)-1,4:3,6-dianhydro-D-glucitol;

2-O-(4-{[4-(acryloyloxy)-2-methoxybenzoyl]oxy}-2-methoxybenzoyl)-5-O-(4-{[4-(acryloyloxy)-3-methoxybenzoyl]oxy}-2-methoxybenzoyl)-1,4:3,6-dianhydro-D-glucitol;

2-O-(4-{[4-(acryloyloxy)-2-methoxybenzoyl]oxy}benzoyl)-5-O-(4-{[4-(acryloyloxy)-3-methoxybenzoyl]oxy}benzoyl)-1,4:3,6-dianhydro-D-glucitol;

2-O-(4-{[4-(acryloyloxy)-2-methoxybenzoyl]oxy}-2,5-dimethylbenzoyl)-5-O-(4-{[14-(acryloyloxy)-3-methoxybenzoyl]oxy}-3-methylbenzoyl)-1,4:3,6-dianhydro-D-glucitol;

2-O-(4-{[4-(acryloyloxy)-2-methoxybenzoyl]oxy}-2-methylbenzoyl)-5-O-(4-{[4-(acryloyloxy)-3-methoxybenzoyl]oxy}-3-methylbenzoyl)-1,4:3,6-dianhydro-D-glucitol;

2-O-(4-{[4-(acryloyloxy)-2-methoxy-5-methylbenzoyl]oxy}-2-methylbenzoyl)-5-O-(4-{[4-(acryloyloxy)-5-methoxy-2-methylbenzoyl]oxy}-3-methylbenzoyl)-1,4:3,6-dianhydro-D-glucitol;

2-O-(4-{[4-(acryloyloxy)benzoyl]oxy}-2-ethoxybenzoyl)-5-O-(4-{[4-(acryloyloxy)-3-ethoxybenzoyl]oxy}benzoyl)-1,4:3,6-dianhydro-D-glucitol;

2-O-(4-{[4-(acryloyloxy)benzoyl]oxy}-2-ethoxy-5-methylbenzoyl)-5-O-(4-{[4-(acryloyloxy)-3-ethoxybenzoyl]oxy}benzoyl)-1,4:3,6-dianhydro-D-glucitol;

2-O-(4-{[4-(acryloyloxy)benzoyl]oxy}-2-ethoxy-5-methylbenzoyl)-5-O-(4-{[4-(acryloyloxy)-5-ethoxy-2-methylbenzoyl]oxy}benzoyl)-1,4:3,6-dianhydro-D-glucitol 2-O-(4-{[4-(acryloyloxy)-3-ethoxybenzoyl]oxy}benzoyl)-5-O-(4-{[4-(acryloyloxy)-2-methylbenzoyl]oxy}-2-ethoxybenzoyl)-1,4:3,6-dianhydro-D-glucitol;

2-O-(4-{[4-(acryloyloxy)-2,5-dimethylbenzoyl]oxy}-2-ethoxybenzoyl)-5-O-(4-{[4-(acryloyloxy)-2-methylbenzoyl]oxy}-2-ethoxybenzoyl)-1,4:3,6-dianhydro-D-glucitol 2,5-bis-O-(4-{[4-(acryloyloxy)-2,5-dimethylbenzoyl]oxy}-2-ethoxybenzoyl)-1,4:3,6-dianhydro-D-glucitol;

2,5-bis-O-(4-{[4-(acryloyloxy)-2-ethoxybenzoyl]oxy}-2-ethoxybenzoyl)-1,4:3,6-dianhydro-D-glucitol;

2,5-bis-O-(4-{[4-(acryloyloxy)-2-methoxybenzoyl]oxy}-2-ethoxybenzoyl)-1,4:3,6-dianhydro-D-glucitol;

2,5-bis-O-(4-{[4-(acryloyloxy)-2-ethoxybenzoyl]oxy}-2-methoxybenzoyl)-1,4:3,6-dianhydro-D-glucitol;

2,5-bis-O-(4-{[4-(acryloyloxy)-2-ethoxybenzoyl]oxy}-3-methylbenzoyl)-1,4:3,6-dianhydro-D-glucitol; and 2,5-bis-O-(4-{[4-(acryloyloxy)-2-ethoxybenzoyl]oxy}-3-methoxybenzoyl)-1,4:3,6-dianhydro-D-glucitol.

The one or more chiral dopant compounds B will usually be present in a total concentration of from 0.1% to 30% by weight, e.g., from 0.1% to 25%, or from 0.1% to 20% by weight, based on the total weight of the precursor composition. The best results will often be obtained with concentrations of from 3% to 10% by weight, e.g., from 5% to 8% by weight, based on the total weight of the precursor composition. The one or more nematic compounds A will often be present in a concentration of from 30% to 50% by weight, based on the total weight of the precursor composition.

The precursor composition for making the CLCP layer of the marking of the present invention can be applied to the surface of a support (substrate) carrying the printable code or onto the surface of the distribution of flakes layer by any method that is suitable for forming a CLCP layer such as, for example, by spray coating, knife coating, roller coating, screen coating, and curtain coating.

The thickness of the applied precursor composition, after curing, according to the above described application techniques, will usually be at least 1 µm, e.g., at least 3 µm, or at least 4 µm, and will usually be not more than 20 µm, e.g., not more than 15 µm, not more than 12 µm, not more than 10 µm, or not more than about 5 µm.

The CLCP precursor composition will usually comprise a solvent to adjust its viscosity to a value which is suitable for the employed application technique. Typical viscosity values are often in the range of from about 4 to about 30 mPa.s at 25° C. Suitable solvents are known to those of skill in the art. Non-limiting examples thereof include low-viscosity, slightly polar and aprotic organic solvents, such as, e.g., methyl ethyl ketone (MEK), acetone, cyclohexanone, ethyl acetate, ethyl 3-ethoxypropionate, toluene and mixtures of two or more thereof.

If the CLCP precursor composition for use in the present invention is to be cured/polymerized by UV radiation the composition will also comprise at least one photoinitiator that shows a non-negligible solubility in the composition. Non-limiting examples of the many suitable photoinitiators include α-hydroxyketones such as 1-hydroxy-cyclohexyl-phenyl-ketone and a mixture (e.g., about 1:1) of 1-hydroxy-cyclohexyl-phenyl-ketone and one or more of benzophenone, 2-hydroxy-2-methyl-1-phenyl-1-propanone, and 2-hydroxy-1-[4-(2-hydroxyethoxy)phenyl]-2-methyl-1-propanone; phenylglyoxylates such as methylbenzoylformate and a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester; benzyldimethyl ketals such as alpha, alpha-dimethoxy-alpha-phenylacetophenone; α-aminoketones such as 2-benzyl-2-(dimethylamino)-1-[4-(4-morpholinyl)phenyl]-1-butanone and 2-methyl-1-[4-(methylthio)phenyl]-2-(4-morpholinyl)-1-propanone; phosphine oxide and phosphine oxide derivatives such as diphenyl (2,4,6-trimethylbenzoyl)-phosphine oxide; phenyl bis(2,4,6-trimethylbenzoyl) supplied by Ciba; and also thioxanthone derivatives such as Speedcure ITX (CAS 142770-42-1), Speedcure DETX (CAS 82799-44-8), Speedcure CPTX (CAS 5495-84-1-2 or CAS 83846-86-0) supplied by Lambson.

If the precursor composition is to be cured by a method which is different from irradiation with UV light such as, e.g., by means of high-energy particles (e.g., electron beams), X-rays, gamma-rays, etc. the use of a photoinitiator can, of course, be dispensed with.

The precursor composition for making the CLCP layer of the marking of the present invention may also comprise a variety of other optional components which are suitable and/or desirable for achieving a particular desired property of the CLCP layer and in general, may comprise any components/substances which do not adversely affect the detectability (readability) of the printable code beneath the CLCP layer. Non-limiting examples of such optional components are surfactants, resins, silane compounds, sensitizers for the photoinitators (if present), etc. For example, the composition may comprise one or more silane compounds which show a non-negligible solubility in the composition. Non-limiting examples of suitable silane compounds include optionally polymerizable silanes such as those of formula $R_1R_2R_3$—Si—$R_4$ wherein $R_1$, $R_2$, and $R_3$ independently represent alkoxy and alkoxyalkoxy having a total of from 1 to about 6 carbon atoms and $R_4$ represents vinyl, allyl, ($C_{1-10}$)alkyl, (meth)acryloxy($C_{1-6}$)alkyl, and glycidyloxy($C_{1-6}$)alkyl such as, e.g., vinyltriethoxysilane, vinyltrimethoxysilane, vinyltris(2-methoxyethoxy)silane, 3-methacryloxypropyl-trimethoxysilane, octyltri-ethoxysilane, and 3-glycidyloxypropyl triethoxysilane from the Dynasylan® family supplied by Evonik.

Following the application of the precursor composition onto at least a part of the printable code carried on a temporary or permanent support in the form of a layer the precursor composition is brought to a chiral liquid crystal state. To that end the precursor composition will usually be heated, whereby the solvent contained in the composition, if present, is evaporated and the promotion of the chiral liquid crystal state takes place. The temperature used to evaporate the solvent and to promote the formation of the liquid crystal state depends on the components of the precursor composition and will in many cases range from 55° C. to 150° C., e.g., from 55° C. to 100° C., preferably from 60° C. to 100° C. Examples of suitable heating sources include conventional heating means and in particular, radiation sources such as, e.g., an IR lamp. The required heating time depends on several factors such as, e.g., the components of the precursor composition, the type of heating device and the intensity of the heating (energy output of the heating device). In many cases a heating time of from 1 second to 30 seconds such as, e.g., not more than 20 seconds, not more than 10 seconds, or not more than 5 seconds will be sufficient. Once the chiral liquid crystal state has been reached the composition is cured, for example by exposing it to UV radiation (provided a photoinitiator is present in the composition).

In a still further embodiment of the CLCP layer of the marking of the present invention, the optical (e.g., color shifting) properties of the layer may have been modified in one or more areas thereof. Examples of methods by which this modification may be accomplished are disclosed in, e.g., WO 2011/069689, WO 2011/069690, WO 2011/069691 and WO 2011/069692, mentioned above, as well as in WO 2012/076533 and WO 2012/076534.

Some of the methods which can be used to modify the optical properties of a CLCP layer of the marking according to the present invention will be described in the following.

For example, after the CLCP precursor composition has been applied onto at least a part of the printable code or the distribution of flakes layer and has been heated to bring it to a chiral liquid crystal state, there may be applied onto the precursor composition in one or more areas thereof at least one modifying composition which modifies the chiral liquid crystal state locally in the one or more areas (optionally upon heating, depending on the type of modifying composition).

More specifically, following the application of the CLCP precursor composition and the formation of a chiral liquid crystal state, a (at least one) modifying composition may be applied onto one or more areas of the applied CLCP precursor composition in the chiral liquid crystal state. The modifying composition is capable of changing the chiral liquid crystal state (optionally upon heating, depending on the type of modifying composition). The modifying composition may be applied while the CLCP precursor composition is still in a heated state (e.g., immediately following the completion of the heating operation) or may be applied after the chiral liquid crystal precursor composition has cooled down to at least some extent (e.g., is at substantially room temperature).

Depending on its nature, the modifying composition will usually modify the chiral liquid crystal state from a (predominantly or substantially) anisotropic state which is characterized by specific optical (e.g., color-shifting) properties to:
(i) a (predominantly or substantially) isotropic liquid crystal state where the color shifting properties of the liquid crystal state are substantially absent and/or no longer detectable with the unaided human eye, or
(ii) a modified chiral liquid crystal state with at least one optical property that is different from a corresponding optical property of the initial chiral liquid crystal state.

The modifying composition may, for example, be or comprise a modifying agent. The modifying agent will usually comprise one or more aprotic organic compounds which are liquid at room temperature and preferably have a relatively high dipole moment and a relatively high dielectric constant. Non-limiting examples thereof include ketones having from 3 to about 6 carbon atoms, alkyl esters and dialkylamides of carboxylic acids which comprise a total of from 2 to about 6 carbon atoms, dialkyl sulfoxides comprising a total of from 2 to about 4 carbon atoms, and optionally substituted (e.g., alkyl-substituted) nitrobenzene such as, e.g., dimethyl ketone, methyl ethyl ketone, cyclohexanone, ethyl acetate, dimethyl formamide, dimethyl sulfoxide, nitrobenzene, nitrotoluene, and mixtures of two or more thereof. Preferred compounds for use in the modifying agent include acetone, methyl ethyl ketone and ethyl acetate.

A modifying agent for use in modifying the CLCP layer of the marking of the present invention may further comprise one or more resins to adjust its viscosity. Of course, the resin(s) must be compatible with the application (e.g., printing) technique that is to be employed. Non-limiting examples of resins which may be suitable, depending on the particular circumstances, include polyesters resins such as, e.g., DYNAPOL® L 1203, L 205, L 206, L 208, L 210, L 411, L 651, L658, L 850, L 912, L 952, LH 530, LH 538, LH 727, LH 744, LH 773, LH 775, LH 818, LH 820, LH 822, LH 912, LH 952, LH 530, LH 538, LH 727, LH 744, LH 773, LH 775, LH 818, LH 820, LH 822, LH 823, LH 826, LH 828, LH 830, LH 831, LH 832, LH 833, LH 838, LH898, LH 908, LS436, LS615, P1500, S1218, S1227, S1247, S1249, S1252, S1272, S1401, S1402, S1426, S1450, S1510, S1606, S1611, S243, S320, S341, S361, S394, and S EP1408 from Evonik. Other suitable resins known to those of skill in the art may be used as well. In a preferred embodiment the one or more resins are selected from DYNAPOL® L 1203, L 205, L 206, L 208, L 210, L 411, L 651, L658, L 850, L 912, L 952, LH 530, LH 538, LH 727, LH 744 from Evonik. A typical concentration range for the one or more resins is from 3% to 15% by weight, based on the total weight of the modifying agent.

Where the modifying agent comprises a solvent or a solvent mixture, after the evaporation of the solvent the initial chiral liquid crystal state will locally (in one or more area(s)) switch from a (predominantly or substantially) anisotropic state to a (predominantly or substantially) isotropic state.

In another embodiment the modifying composition may be or comprise a second CLCP precursor composition. The second precursor composition which is applied in one or more areas of the layer of the first precursor composition in the initial chiral liquid crystal state may be the same as or different from the first precursor composition. Further, everything that is set forth above with respect to the first precursor composition (e.g., components, application methods, etc.) applies equally and without exception also to the second precursor composition.

If the second precursor composition is different from the first precursor composition the one or more differences may relate to, e.g., one or more of the compounds A and B that are present in these compositions and/or to the concentrations of one or more of these compounds. For example, a or the only difference between these compositions may be that one or more (or all) of the chiral dopant compounds B are present in the second composition in a concentration/concentrations that is/are different from the corresponding concentration/concentrations in the first composition. Further, a or the only difference between the first and second compositions may be that the one or more chiral dopant compounds B in the first composition are of formula (I) above and/or related formulae and at least one of the one or more chiral dopant compounds B in the second composition is different from formula (I) and/or related formulae. For example, at least one of the one or more chiral dopant compounds B in the second composition may be an isosorbide or isomannide derivative as described in, e.g., EP-B-0 847 432, GB-A-2 330 139, and U.S. Pat. No. 6,589,445.

After the application (e.g. deposition) of the second precursor composition to one or more areas of the layer formed by the first precursor composition in the initial chiral liquid crystal state having initial optical properties, the second precursor composition is brought to a second chiral liquid crystal state having different optical properties. To that end at least a part of the one or more areas onto which the second precursor composition has been applied is heated, the solvent contained in the composition, if present, is evaporated and the promotion of the desired second chiral liquid crystal state takes place. The temperature used to evaporate the solvent and to promote the formation of the second liquid crystal state depends on the components of the second precursor composition and will in many cases range from 55° C. to 150° C., e.g., from 55° C. to 100° C., preferably from 60° C. to 100° C. Examples of suitable heating sources include conventional heating means and in particular, radiation sources such as, e.g., an IR lamp.

In yet another embodiment, the modifying composition for use in the present invention may be or comprise a chiral dopant composition. The chiral dopant composition preferably comprises one or more (e.g., one, two, three or four) chiral dopant compounds C of formula (I) set forth above and/or related formulae. In a more preferred embodiment the chiral dopant composition comprises at least one chiral dopant compound C and at least one other chiral dopant D which is different from a compound of formula (I) and related formulae. The at least one chiral dopant compound D may be selected, for example, from the derivatives of isosorbides and isomannides which are disclosed in, e.g., EP-B-0 847 432, GB-A-2 330 139, and U.S. Pat. No. 6,589,445.

As chiral dopant compounds C which are preferably present in the chiral dopant composition the chiral dopant compounds B set forth above may, for example, be used. Accordingly, everything that is set forth above with respect to compounds B applies equally and without exception also to compounds C. Also, it is to be appreciated that a (or the only) chiral dopant compound C that is present in the chiral dopant composition may be identical to a (or the only) chiral dopant compound B that is present in the chiral liquid crystal precursor composition.

The chiral dopant composition will usually comprise the one or more chiral dopant compounds in a total concentration of from 0.1% to 30% by weight, e.g., from 0.1% to 25%, or from 0.1% to 20% by weight, based on the total weight of the composition. Often, the total concentration will be from 3% to 10% by weight, e.g., from 5% to 8% by weight, based on the total weight of the chiral dopant composition.

The chiral dopant composition will usually comprise a solvent to adjust its viscosity to a value which is suitable for the employed application (e.g., printing) technique. Suitable solvents are known to those of skill in the art. Non-limiting examples thereof include low-viscosity, slightly polar and aprotic organic solvents, such as, e.g., methyl ethyl ketone (MEK), acetone, cyclohexanone, ethyl acetate, ethyl 3-ethoxypropionate, toluene and mixtures of two or more thereof.

After the application of the chiral dopant composition to one or more areas of the CLCP precursor composition in the initial chiral liquid crystal state, the one or more areas are brought to a modified chiral liquid crystal state having modified optical properties. To that end the one or more areas onto which the chiral dopant composition has been applied are heated, the solvent contained in the composition, if present, is evaporated and the promotion of the desired modified chiral liquid crystal state takes place. The temperature used to evaporate the solvent and to promote the formation of the modified liquid crystal state depends on, e.g., the components of chiral dopant composition and will in many cases range from 55° C. to 150° C., e.g., from 55° C. to 100° C., preferably from 60° C. to 100° C. Examples of suitable heating sources include conventional heating means and in particular, radiation sources such as, e.g., an IR lamp.

The application of the modifying composition is performed onto one or more areas of the precursor composition in the initial chiral liquid crystal state preferably with a printing technique and in particular, a technique selected from continuous ink-jet printing, drop-on-demand ink-jet printing, valve-jet printing and spray coating. In a preferred embodiment ink-jet techniques are used for applying the modifying composition. The industrial ink-jet printers, commonly used for numbering and coding and marking applications on conditioning lines and printing presses, are particularly suitable. Preferred ink-jet printers are single nozzle continuous ink-jet printers (also called raster or multi level deflected printers) and drop-on-demand ink-jet printers, in particular valve-jet printers. The modified area(s) of the CLCP layer of the marking of the present invention may be present in any form or pattern such as, e.g., a logo, a geometric figure such as a square, a graphic design, etc.

It is, of course, possible to use more than one modifying composition, and to apply these compositions simultaneously and/or successively onto the applied (first) precursor composition (e.g., in different areas of the applied first precursor composition).

The modified CLCP layer of the marking according to the present invention is finally obtained by curing and/or polymerizing the precursor composition in the initial chiral liquid crystal state that has been locally modified (in one or more areas) by the application of the modifying composition. The fixing or hardening is preferably performed by irradiation with UV-light, which induces polymerization of the polymerizable groups present in the precursor composition (and optionally in the modifying composition).

Yet another possible method of modifying the optical properties of the CLCP layer of the marking of the present invention in one or more areas thereof (which method can be used alone or in combination with one or more of the methods of modifying the optical properties of a CLCP layer set forth above) involves the use of a salt in the CLCP precursor composition, in combination with a layer or pattern of a modifying resin that is in contact with the applied uncured precursor composition in the chiral liquid crystal state (e.g., in the form of an intermediate layer or pattern between the printable code and the layer of the applied CLCP precursor composition). Of course, the layer or pattern of modifying resin must not interfere with the detectability (e.g., readability) of the printable code of the marking of the present invention.

More specifically, the CLCP precursor composition may comprise at least one salt that changes (usually in a concentration-dependent manner) the position of a selective reflection band ($\lambda_{max}$) exhibited by the composition (in a chiral liquid crystal state) compared to the position of the selective reflection band exhibited by an (otherwise identical) composition that does not contain the at least one salt. Further, the modifying resin in contact with the uncured CLCP layer or pattern changes the position of the selective reflection band exhibited by the cured chiral liquid crystal precursor composition comprising the at least one salt (when in a chiral liquid crystal state) in the one or more areas. The term "modifying resin" as used herein includes cured resins as set forth below, and also includes aqueous resins such as, e.g., polyamide resins (for example, CAS No 175893-71-7, CAS No 303013-12-9, CAS No 393802-62-5, CAS No 122380-38-5, CAS No 9003-39-8), alkyd resins (e.g. of the polyester type), and polyacrylates.

The at least one salt that changes the position of the selective reflection band exhibited by the CLCP layer may be selected from metal salts and (preferably quaternary) ammonium salts.

For example, the at least one salt may comprise at least one salt of a metal such an alkali or alkaline earth metal (e.g., Li, Na), for example, one or more of lithium perchlorate, lithium nitrate, lithium tetrafluoroborate, lithium bromide, lithium chloride, sodium carbonate, sodium chloride, sodium nitrate, and/or one or more (organically substituted) ammonium salts such as tetraalkylammonium salts, for example, one or more of tetrabutylammonium perchlorate, tetrabutylammonium chloride, tetrabutylammonium tetrafluoroborate, and tetrabutylammonium bromide.

Further, at least one of the one or more polymerizable monomers used for providing a modifying resin for use in the present invention may comprise at least two unsaturated carbon-carbon bonds and/or at least one of the one or more polymerizable monomers may comprise at least one heteroatom, preferably selected from O, N and S and in particular, O and/or N. For example, at least one of the one or more polymerizable monomers used for providing the modifying resin may comprise one or more groups of formula $H_2C=CH-C(O)-$ or $H_2C=C(CH_3)-C(O)-$. Non-limiting examples of corresponding monomers include polyether acrylates, modified polyether acrylates (such as, e.g., amine-modified polyether acrylates), polyester acrylates, modified polyester acrylates (such as, e.g., amine-modified polyester acrylates), hexafunctional polyester acrylates, tetrafunctional polyester acrylates, aromatic difunctional urethane acrylates, aliphatic difunctional urethane acrylates, aliphatic trifunctional urethane acrylates, aliphatic hexafunctional urethane acrylates, urethane monoacrylates, aliphatic diacrylates, bisphenol A epoxy acrylates, modified bisphenol A epoxy acrylates, epoxy acrylates, modified epoxy acrylates (such as, e.g., fatty acid modified epoxy acrylates), acrylic oligomers, hydrocarbon acrylate oligomers, ethoxylated phenol acrylates, polyethylene glycol diacrylates, propoxylated neopentyl glycol diacrylates, diacrylated bisphenol A derivatives, dipropylene glycol diacrylates, hexanediol diacrylates, tripropylene glycol diacrylates, polyether tetraacrylates, ditrimethylol propane tetraacrylates, dipentaerythritol hexaacrylates, mixtures of pentaerythritol tri- and tetraacrylates, dipropylene glycol diacrylates, hexanediol diacrylates, ethoxylated trimethylol propane triacrylates, and tripropylene glycol diacrylates.

In another embodiment, the modifying resin for changing the position of the selective reflection band exhibited by the salt-containing cured CLCP layer of the marking of the present invention may comprise a radiation-cured resin, for example, a UV-cured resin.

Further, instead of providing a layer or pattern of modifying resin between a layer of salt-containing CLCP precursor composition and printable code, a layer or pattern of modifying resin may be provided underneath the printable code. In this way the salt-containing CLCP precursor composition comes into direct contact with the layer of pattern of modifying resin in only those areas thereof which are not covered by the ink of the printable code (for example, in the areas of a data matrix which are blank). Accordingly, a modification of the optical properties of the CLCP layer by the modifying resin will in this case only take place in those areas of the CLCP layer that correspond to the areas of the layer or pattern of modifying resin that do not have (printing) ink on them.

In yet another aspect of the marking of the present invention, the optional layer or pattern of modifying resin underneath the printable code may be replaced by a CLCP layer or pattern which differs from the CLCP layer of the marking of the present invention with respect to at least one optical property, preferably the color and/or the polarity of the light reflected by the CLCP material. In combination with an ink of the printable code that is not transparent for light that is reflected by the CLCP layer or pattern underneath it, for example the color of the marking of the present invention in areas which are free of ink will be different from the color of the marking in areas which are covered by ink used for producing the code.

The precursor composition for providing the optional CLCP layer or pattern underneath the printable code of the marking of the present invention is different from the precursor composition for making the CLCP layer of the marking of the present invention in one or more respects. The one or more differences may relate to, e.g., one or more of the compounds A and B that are present in these compositions and/or to the concentrations of one or more of these compounds. For example, one or the only difference between these compositions may be that one or more (or all) of the chiral dopant compounds B are present in the one precursor composition in a concentration/concentrations that is/are different from the corresponding concentration/concentrations in the other precursor composition. Further, one or the only difference between the first and second compositions may be that the one or more chiral dopant compounds B in one composition are of formula (I) above and/or related formulae and at least one of the one or more chiral dopant compounds B in the other composition is different from formula (I) and/or related formulae.

In a still further aspect of the marking according to the present invention, the CLCP layer thereof may comprise one or more materials having detectable properties (e.g., optical and in particular, spectral properties) that are different from a property of the CLCP layer itself to further increase the complexity and further reduce the reproducibility of the marking of the present invention. Of course, these materials must not interfere with the detectability (e.g., readability) of the printable code underneath the CLCP layer. For example, the one or more materials may include one or more of flakes, fibers, inorganic compounds, organic compounds, dyes, pigments, absorber materials absorbing electromagnetic radiation in the UV and/or visible and/or IR range, luminescent materials, fluorescent materials, phosphorescent materials, colored materials, photochromic materials, thermochromic materials, magnetic materials, and materials having one or more detectable particle size distributions (e.g., having a monomodal or a polymodal size distribution). The one or more materials may be present in the precursor composition of the CLCP layer in individual concentrations of, e.g., from 0.001% to 1% by weight, based on the total weight of the precursor composition. In one embodiment, a corresponding material may comprise one or more functionalities which allow it to become chemically bonded to the composition for making the layer or pattern.

The one or more luminescent materials, if present, may comprise one or more lanthanide compounds such as, e.g., complexes of lanthanides and β-diketo compounds.

Non-limiting examples of fluorescent materials include VAT dyes, perylene, terrylene, quaterrylene derivatives, such as those disclosed in US 2011/0293899 A1.

Non-limiting examples of pigments that are suitable for use in the present invention include those disclosed in WO 2008/000755.

Further non-limiting examples of the one or more materials having detectable properties that are different from the detectable properties of the CLCP layer of the marking of the present invention itself include salts/complexes of the rare earth metals (scandium, yttrium and the lanthanides such as Ce, Pr, Nd, Sm, Eu, Gd, Tb, Dy, Ho, Er, Tm, and Yb) and the actinides.

Non-limiting examples of these salts and complexes are disclosed in US 2010/0307376 A1, such as, e.g., the luminescent lanthanide complexes of the formula:

$$M_3[Ln(A)_3]$$

wherein

M represents $Li^+$, $Na^+$, $K^+$, $Rb^+$, and $Cs^+$, and combinations thereof;

Ln represents a trivalent rare-earth cation of Ce, Pr, Nd, Sm, Eu, Gd, Tb, Dy, Ho, Er, Tm, and Yb, and combinations thereof; and A represents a dinegatively charged, tridentate 5- or 6-membered heteroaryl ligand bearing at least one carboxylic group and optionally being substituted by one or more of hydroxy, amino, $C_1$-$C_6$ alkoxy (e.g., methoxy, ethoxy, isopropoxy, etc.) $C_1$-$C_6$ alkyl (e.g., methyl, ethyl, isopropyl, etc.). The 5- or 6-membered heteroaryl group is selected from, e.g., pyridine, imidazole, triazole, pyrazole, and pyrazine.

Preferably A represents a ligand selected from dipicolinic acid, 4-hydroxypyridine-2,6-dicarboxylic acid, 4-amino-2,6-pyridinecarboxylic acid, 4-ethoxypyridine-2,6-dicarboxylic acid, 4-isopropoxypyridine-2,6-dicarboxylic acid and/or 4-methoxypyridine-2,6-dicarboxylic acid and/or Ln is chosen from $Eu^{3+}$, $Yb^{3+}$ and/or $Tb^{3+}$.

Non-limiting examples of IR absorber materials for use in the CLCP precursor composition (and thus in the CLCP layer of the marking of the present invention) include those disclosed in WO2007/060133. Non-limiting examples of specific materials include copper(II) fluoride ($CuF_2$), copper hydroxyfluoride (CuFOH), copper hydroxide ($Cu(OH)_2$), copper phosphate hydrate ($Cu_3(PO_4)_2 \cdot 2H_2O$), anhydrous copper phosphate ($Cu_3(PO_4)_2$), basic copper(II) phosphates (e.g. $Cu_2PO_4(OH)$, "Libethenite" whose formula is sometimes written as $Cu_3(PO_4) \cdot 2^*Cu(OH)_2$; $Cu_3(PO_4)(OH)_3$, "Cornetite", $Cu_5(PO_4)_3(OH)_4$, "Pseudomalachite", $CuAl_6(PO_4)_4(OH)_8 \cdot 5H_2O$ "Turquoise", etc.), copper (II) pyrophosphate ($Cu_2(P_2O_7) \cdot 3H_2O$), anhydrous copper(II) pyrophosphate ($Cu_2$ ($P_2O_7$)), copper(II) metaphosphate ($Cu(PO_3)_2$, more correctly written as $Cu_3(P_3O_9)_2$), iron(II) fluoride ($FeF_2 \cdot 4H_2O$), anhydrous iron(II) fluoride ($FeF_2$), iron(II) phosphate ($Fe_3(PO_4)_2 \cdot 8H_2O$, "Vivianite"), lithium iron(II) phosphate ($LiFePO_4$, "Triphylite"), sodium iron(II) phosphate ($NaFePO_4$, "Maricite"), iron(II) silicates ($Fe_2SiO_4$, "Fayalite"; $FexMg_2xSiO_4$, "Olivine"), iron(II) carbonate ($FeCO_3$, "Ankerite", "Siderite"); nickel(II) phosphate ($Ni_3(PO_4)_2 \cdot 8H_2O$), and titanium(III) metaphosphate ($Ti(P_3O_9)$). Moreover, a crystalline IR absorber may also be a mixed ionic compound, i.e., where two or more cations are participating in the crystal structure, as e.g. in $Ca_2Fe(PO_4)_2 \cdot 4H_2O$, "Anapaite". Similarly, two or more anions can participate in the structure as in the mentioned basic copper phosphates, where $OH^-$ is the second anion, or even both together, as in magnesium iron phosphate fluoride, $MgFe(PO_4)F$, "Wagnerite". Additional non-limiting examples of materials for use in the present invention are disclosed in WO 2008/128714 A1.

The one or more magnetic materials (including soft magnetic materials and hard magnetic materials) for (optional) use in the CLCP layer of the marking of the present invention may comprise at least one material selected from ferromagnetic materials, ferrimagnetic materials, paramagnetic materials, and diamagnetic materials. For example, the one or more magnetic materials may comprise at least one material selected from metals and metal alloys comprising at least one of iron, cobalt, nickel, and gadolinium. Further, the magnetic material may comprise, without limitation, an alloy of iron, cobalt, aluminum, and nickel (with or without copper, niobium and/or tantalum), such as Alnico, or an alloy of titanium, nickel, cobalt, aluminum, and iron, such as Ticonal; and ceramics. The one or more magnetic materials may also comprise at least one material selected from inorganic oxide compounds such as maghemite and/or hematite, ferrites of formula $MFe_2O_4$ wherein M represents Mg, Mn, Co, Fe, Ni, Cu or Zn, and garnets of formula $A_3B_5O_{12}$ wherein A represents La, Ce, Pr, Nd, Sm, Eu, Gd, Tb, Dy, Ho, Er, Tm, Yb, Lu or Bi and B represents Fe, Al, Ga, Ti, V, Cr, Mn or Co.

The one or more materials may be substantially invisible under light within the visible spectrum but visible under light outside the visible spectrum, such as UV or IR light. Of course, the materials must also be compatible with the liquid crystal polymer.

Additional non-limiting (and preferred) examples of the one or more materials having detectable properties that are different from a property of the CLCP layer of the marking of the present invention include particles and in particular, flakes which are made of, or comprise a CLCP material that has at least one detectable optical property that is different from the corresponding optical property of the CLCP layer itself (such as, e.g., $\lambda_{max}$, polarity of reflected light, etc.). Corresponding flakes may be randomly distributed in the CLCP layer and will often have an average size (largest dimension) of from about 20 μm to about 100 μm. They may have a monomodal or a polymodal (e.g., bimodal) particle size distribution. These flakes are particularly advantageous because they will act as small mirrors and perturbators of the light diffusion or reflection, which complicates the trajectory of the reflected light and makes it almost impossible to replicate the code by conventional reproduction means such as copying machines.

The CLCP particles of flakes may further be present in the form of multilayer particles or flakes, such as those disclosed in U.S. provisional Application No. 61/616,133, filed Mar. 27, 2012, U.S. application Ser. No. 13/801,053, filed Mar. 13, 2013, or US 2010/0200649 A1, the disclosures of which are incorporated by reference herein in their entireties. The multilayer flakes disclosed in this document comprise at least two CLCP layers comprising a first CLCP layer that has a first detectable parameter and a second CLCP layer including a second detectable parameter, and at least one additional layer including a third detectable parameter, the at least one additional layer comprising a material that is not a chiral liquid crystal polymer. The third detectable parameter is different from each of the first detectable parameter and the second detectable parameter.

If one or more materials having detectable properties that are different from a property of the CLCP layer of the marking according to the present invention itself are present in the form of particles and/or flakes, they may be randomly distributed in the CLCP precursor composition and may thus, be randomly distributed in the final cured CLCP layer of the marking according to the present invention. In combination with suitable detection methods for the detectable properties of the one or more materials, this random distribution of particles/flakes can be exploited as an additional means for identifying/authenticating/tracking and/or tracing an article/item that is provided with a marking according to the present invention (i.e., in addition to the printable code and the optical properties of the CLCP layer itself). This will improve the security provided by a corresponding marking even further.

In yet another aspect of the marking of the present invention, an intermediate layer may be arranged between the CLCP layer and the printable code. This layer (which may be provided in the entire area or only a part of the area in which the printable code is covered by the CLCP layer) must be transparent for at least the radiation that is involved in the detection (reading) of the printable code underneath it. The at least one intermediate layer may comprise, for example, a varnish and in particular and preferably, a UV-cured varnish. The varnish preferably is transparent for IR radiation (and must be transparent for UV radiation if the printable code is made with an IR absorbing ink). Varnishes which are suitable for this purpose are known to those skilled in the art and include the modifying resins which are set forth above in connection with the modification of the optical properties of the cured CLCP layer where the corresponding CLCP precursor composition comprises a suitable salt. A specific, non-limiting example of a suitable varnish is set forth in the Examples below.

The intermediate layer serves to accommodate one or more materials having detectable properties that are different from a property of the CLCP layer of the marking to further increase the complexity of the marking of the present invention and/or to further reduce the reproducibility of the marking by, e.g., copying. Examples of suitable materials for incorporation in the intermediate layer include the materials that may be present in the CLCP layer itself and are set forth above (for example, flakes, fibers, inorganic compounds, organic compounds, dyes, pigments, absorber materials absorbing electromagnetic radiation in the UV and/or visible and/or IR range, luminescent materials, fluorescent materials, phosphorescent materials, colored materials, photochromic materials, thermochromic materials, magnetic materials, and materials having one or more detectable particle size distributions).

In other words, instead of incorporating the one or more materials having detectable properties that are different from a property of the CLCP layer in the CLCP layer of the marking of the present invention itself, it may be more convenient or advantageous to incorporate them in an intermediate layer where they can serve the same function as in the CLCP layer. It is, of course, also possible to include the one or more materials in both the CLCP layer and the intermediate layer. In the latter case at least a part of the one or more materials in the CLCP layer will usually be different from the one or more materials in the intermediate layer.

It should also be appreciated that if the CLCP precursor composition comprises at least one salt that changes the position of a selective reflection band ($\lambda_{max}$) exhibited by the composition (in a chiral liquid crystal state) compared to the position of the selective reflection band exhibited by an (otherwise identical) composition that does not contain the at least one salt, at least one or more parts of the intermediate layer comprising the one or more materials having detectable properties that are different from a property of the CLCP layer may be formed by a modifying resin set forth above, i.e., a resin which changes the position of the selective reflection band exhibited by the cured chiral liquid crystal precursor composition comprising the at least one salt (when in a chiral liquid crystal state). Thus the intermediate layer can serve the dual purpose of modifying the selective reflection band of the CLCP layer arranged above it (or at least parts thereof) and containing one or more materials having detectable properties that are different from a property of the CLCP layer (e.g., CLCP flakes having a different $\lambda_{max}$ and/or reflect circularly polarized light of a different polarity).

The preferred incorporation of a layer including a distribution of flakes between the printable code and the CLCP layer provides even a further enhancement to the marking to assist in permitting evidence of tampering, tracking and tracing, etc. of a good upon which the marking is included. As another example, it is seen that by even using a plurality of detectable parameters, such as more than two different sizes of the same flakes and/or different flakes and/or multiple different flakes, and/or detectable elements in addition to the flakes, nearly unlimited coding possibilities are readily obtainable with the flakes disclosed herein. In each situation, the code generated can reflect the nature of the overall set of information associated with the nature of the flakes used in the marking. Accordingly, it can be seen that by increasing the number of detectable parameters, the coding possibilities are nearly unlimited. See, for example, U.S. patent application Ser. No. 13/801,053(which published as US 2012/0061470A1), filed Mar. 13, 2013, or US 2010/0200649 A1, the disclosures of which are incorporated by reference herein in their entireties.

The distribution of flakes can comprise flat flakes, which, on the one hand, have a significant two-dimensional size (typically 50 micrometers or more), and therefore allow for an easy detection and, at the same time, are not easily lost due to friction, wear or crumpling of the document or item carrying the marking, and which, on the other hand, have a small thickness, which makes them compatible with the common printing processes. The flakes can have a total thickness of from about 5 µm to about 100 µm. See, for example, U.S. application No. 13/801,053, filed Mar. 13, 2013, (which published as US 2013/0256415 A1 ) or U.S. 2010/0200649 A1, the disclosures of which are incorporated by reference herein in their entireties.

The flakes are applied at low surface density, i.e., so as to result in a moderate number of flakes present over the marking, in order to limit the data set representing the marking to a size which can be easily treated and stored on existing processing equipment and at sufficient speed. The random distribution can be detectable in an area of at least 1 mm$^2$, preferably 10 mm$^2$, more preferably 100 mm$^2$. The flake density is preferably not higher than 1000 flakes/mm$^2$, more preferably not higher than 100 flakes/mm$^2$, more preferably not higher than 35 flakes/mm$^2$, and even more preferably not higher than 7 flakes/mm$^2$.

The layer including the distribution of flakes has a sufficiently large, non-microscopic size, so as to facilitate its localization and scanning on the document or item.

The use of a distribution of flakes as an identifier requires the reading of this distribution, and thus should include the presence of a reference mark to locate this distribution of flakes. An advantage of the present invention is the presence of a mono-dimensional or bidimensional code which serves not only as a part of the identifier but also as a reference mark to locate efficiently and easily said distribution of flakes and creates a corresponding unique code that will be useful for track and trace purposes. Another advantage of the marking according to the present invention is the enhanced security against alteration. If the mono-dimensional code or the bidimensional code is altered and becomes unreadable, it keeps its function as a reference mark and the code based on the distribution of flakes will be still obtained.

The flakes can comprise at least one CLCP layer and optionally one or more and additional layers, such as an additional layer made with luminescent and/or magnetic material. At least part of the flakes can be chiral liquid crystal polymer (CLCP) flakes having at least one layer of CLCP. Such polymers reflect a circular polarized light component; that means that within a determined wavelength range, light having a determined circular polarization state (left- or right-handed, depending on the polymer) is predominantly reflected. Cholesteric liquid crystal polymers have a molecular order in the form of helically arranged molecular stacks. This order is at the origin of a periodic spatial modulation of the material's refractive index, which in turn results in a selective transmission/reflection of determined wavelengths and polarizations of light. The particular situation of the helical molecular arrangement in CLCPs causes the reflected light to be circular polarized, left-handed or right-handed, depending on the sense of rotation of the molecular helical stack. A marking comprising a random distribution of CLCP flakes thus provides the document or item with a unique optical signature, detectable and distinguishable through its specific reflection of circular polarized light. The flakes can appear in random positions and orientations on the printed document or item. The marking, which can be almost transparent, but distinguishable from the background through its polarization effect, can be used in all kind of authentication, identification, tracking and tracing applications, for all kind of documents or goods.

A chiral liquid crystal precursor composition is used for making a CLCP flake. The chiral liquid crystal precursor composition preferably comprises a mixture of (i) one or more nematic (precursor) compounds A and (ii) one or more cholesteric (i.e., chiral dopant) compounds B (including cholesterol) which are capable of giving rise to a cholesteric state of the composition. The pitch of the obtainable cholesteric state depends on the relative ratio of the nematic and the cholesteric compounds. Typically, the (total) concentration of the one or more nematic compounds A in the chiral liquid crystal precursor composition for use in the present invention will be about five to about twenty times the (total) concentration of the one or more cholesteric compounds B. Thus, the chiral liquid crystal polymer layer can be formed from a chiral liquid crystal precursor composition comprising (i) one or more (e.g. two, three, four, five or more and in particular, at least two) different nematic compounds A and (ii) one or more (e.g., two, three, four, five or more) different chiral dopant compounds B which are capable of giving rise to a cholesteric state of the chiral liquid crystal precursor composition upon heating. Further, both the one or more nematic compounds A and the one or more chiral dopant compounds B may comprise at least one compound which comprises at least one polymerizable group. For example, all of the one or more nematic compounds A and all of the one or more chiral dopant compounds B may comprise at least one polymerizable group. The at least one polymerizable group may, for example, comprise a group which is able to take part in a free radical polymerization and in particular, a (preferably activated) unsaturated carbon-carbon bond such as, e.g., a group of formula $H_2C=CH-C(O)-$.

The chiral liquid crystal precursor composition preferably comprises a mixture of (i) one or more nematic (precursor) compounds A and (ii) one or more cholesteric (i.e., chiral dopant) compounds B (including cholesterol) which are capable of giving rise to a cholesteric state of the composition. The pitch of the obtainable cholesteric state depends on the relative ratio of the nematic and the cholesteric compounds. Typically, the (total) concentration of the one or more nematic compounds A in the chiral liquid crystal precursor composition for use in the present invention will be about five to about twenty times the (total) concentration of the one or more cholesteric compounds B.

Nematic (precursor) compounds A which are suitable for use in the chiral liquid crystal precursor composition are known in the art; when used alone (i.e., without cholesteric compounds) they arrange themselves in a state characterized by its birefringence. Non-limiting examples of nematic compounds A which are suitable for use in the present invention are described in, e.g., WO 93/22397, WO 95/22586, EP-B-0 847 432, U.S. Pat. No. 6,589,445, US 2007/0224341 A1. The entire disclosures of these documents are incorporated by reference herein.

A preferred class of nematic compounds for use in the present invention comprises one or more (e.g., 1, 2 or 3) polymerizable groups, identical or different from each other, per molecule. Examples of polymerizable groups include groups which are capable of taking part in a free radical polymerization and in particular, groups comprising a carbon-carbon double or triple bond such as, e.g., an acrylate moiety, a vinyl moiety or an acetylenic moiety. Particularly preferred as polymerizable groups are acrylate moieties.

The nematic compounds for use in the present invention further may comprise one or more (e.g., 1, 2, 3, 4, 5 or 6) optionally substituted aromatic groups, preferably phenyl groups. Examples of the optional substituents of the aromatic groups include those which are set forth herein as examples of substituent groups on the phenyl rings of the chiral dopant compounds of formula (I) such as, e.g., alkyl and alkoxy groups.

Examples of groups which may optionally be present to link the polymerizable groups and the aryl (e.g., phenyl) groups in the nematic compounds A include those which are exemplified herein for the chiral dopant compounds B of formula (I) (including those of formula (IA) and formula (IB) set forth below). For example, the nematic compounds A may comprise one or more groups of formulae (i) to (iii) which are indicated below as meanings for $A_1$ and $A_2$ in formula (I) (and formulae (IA) and (IB)), typically bonded to optionally substituted phenyl groups. Specific non-limiting examples of nematic compounds which are suitable for use in the present invention are given below in the Example.

The one or more cholesteric (i.e., chiral dopant) compounds B for use in the present invention preferably comprise at least one polymerizable group.

Suitable examples of the one or more chiral dopant compounds B include those of formula (I):

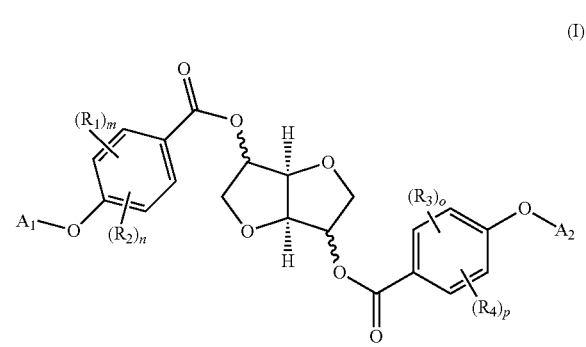

(I)

wherein:
$R_1$, $R_2$, $R_3$, $R_4$, $R_5$, $R_6$, $R_7$ and $R_8$ each independently denote $C_1$-$C_6$ alkyl and $C_1$-$C_6$ alkoxy;

$A_1$ and $A_2$ each independently denote a group of formula (i) to (iii):

—[(CH$_2$)$y$-O]$_z$—C(O)—CH=CH$_2$;  (i)

—C(O)-D$_1$-O—[(CH$_2$)$_y$—O]$_z$—C(O)—CH=CH$_2$;  (ii)

—C(O)-D$_2$-O—[(CH$_2$)$_y$—O]$_z$—C(O)—CH=CH$_2$;  (iii)

D$_1$ denotes a group of formula

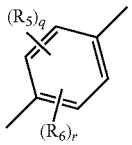

D$_2$ denotes a group of formula

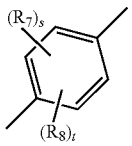

m, n, o, p, q, r, s, and t each independently denote 0, 1, or 2;

y denotes 0, 1, 2, 3, 4, 5, or 6;

z equals 0 if y equals 0 and z equals 1 if y equals 1 to 6.

In one aspect, the one or more chiral dopant compounds B may comprise one or more isomannide derivatives of formula (IA):

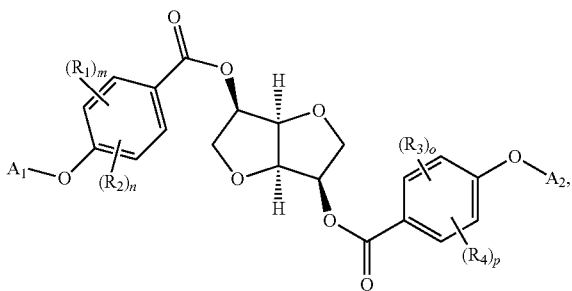

(IA)

wherein:

$R_1$, $R_2$, $R_3$, $R_4$, $R_5$, $R_6$, $R_7$ and $R_8$ each independently denote $C_1$-$C_6$ alkyl and $C_1$-$C_6$ alkoxy;

$A_1$ and $A_2$ each independently denote a group of formula (i) to (iii):

—[(CH$_2$)$y$-O]$z$-C(O)—CH=CH$_2$;  (i)

—C(O)-D$_1$-O—[(CH$_2$)$y$-O]$z$-C(O)—CH=CH$_2$;  (ii)

—C(O)-D$_2$-O—[(CH$_2$)$y$-O]$z$-C(O)—CH=CH$_2$;  (iii)

D$_1$ denotes a group of formula

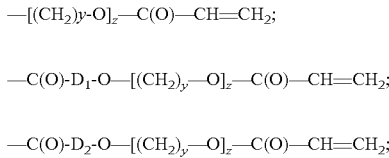

D$_2$ denotes a group of formula

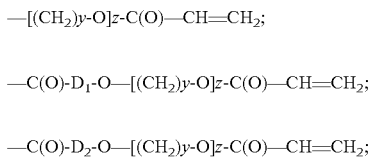

m, n, o, p, q, r, s, and t each independently denote 0, 1, or 2;

y denotes 0, 1, 2, 3, 4, 5, or 6;

z equals 0 if y equals 0 and z equals 1 if y equals 1 to 6.

In one embodiment of the compounds of formula (IA) (and of compounds of formula (I)), $R_1$, $R_2$, $R_3$, $R_4$, $R_5$, $R_6$, $R_7$ and $R_8$ each independently denote $C_1$-$C_6$ alkyl. In an alternative embodiment, $R_1$, $R_2$, $R_3$, $R_4$, $R_5$, $R_6$, $R_7$ and $R_8$ in formula (IA) (and in formula (I)) each independently denote $C_1$-$C_6$ alkoxy.

In another embodiment of the compounds of formula (I) and of formula (IA), $A_1$ and $A_2$ each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkyl; and m, n, o, and p each independently denote 0, 1, or 2. In yet another embodiment, $A_1$ and $A_2$ in formula (I) and formula (IA) each independently denote a group of formula —[(CH$_2$)$_y$—O]$_z$—C(O)—CH=CH$_2$; $R_1$, $R_2$, $R_3$ and $R_4$ each independently denote $C_1$-$C_6$ alkoxy; and m, n, o, and p each independently denote 0, 1, or 2.

In another embodiment of the compounds of formula (IA) (and of formula (I)), $A_1$ and $A_2$ each independently denote a group of formula —C(O)-D$_1$-O—[(CH$_2$)$_y$—O]$_z$—C(O)—CH=CH$_2$ and/or of formula —C(O)-D$_2$-O—[(CH$_2$)$_y$—O]$_z$—C(O)—CH=CH$_2$; and $R_1$, $R_2$, $R_3$, $R_4$, $R_5$, $R_6$, $R_7$ and $R_8$ each independently denote $C_1$-$C_6$ alkyl. In an alternative embodiment, $A_1$ and $A_2$ in formula (IA) (and in formula (I)) each independently denote a group of formula —C(O)-D$_1$-O—[(CH$_2$)$_y$—O]$_z$—C(O)—CH=CH$_2$ and/or a group of formula —C(O)-D$_2$-O—[(CH$_2$)$_y$—O]$_z$—C(O)—CH=CH$_2$; and $R_1$, $R_2$, $R_3$, $R_4$, $R_5$, $R_6$, $R_7$ and $R_8$ each independently denote $C_1$-$C_6$ alkoxy.

In another aspect, the one or more chiral dopant compounds B may comprise one or more isosorbide derivatives represented by formula (IB):

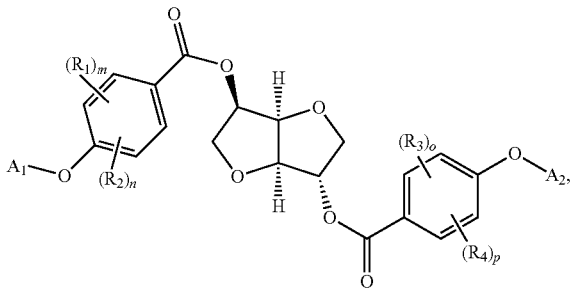

(IB)

wherein:

$R_1, R_2, R_3, R_4, R_5, R_6, R_7$ and $R_8$ each independently denote $C_1\text{-}C_6$ alkyl and $C_1\text{-}C_6$ alkoxy;

$A_1$ and $A_2$ each independently denote a group of formula (i) to (iii):

$$—[(CH_2)_y\text{-}O]_z\text{-}C(O)—CH=CH_2; \quad \text{(i)}$$

$$—C(O)\text{-}D_1\text{-}O—[(CH_2)_y\text{-}O]_z\text{-}C(O)—CH=CH_2; \quad \text{(ii)}$$

$$—C(O)\text{-}D_2\text{-}O—[(CH_2)_y\text{-}O]_z\text{-}C(O)—CH=CH_2; \quad \text{(iii)}$$

$D_1$ denotes a group of formula

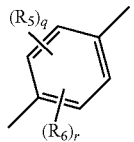

$D_2$ denotes a group of formula

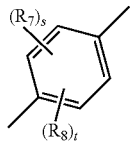

m, n, o, p, q, r, s, and t each independently denote 0, 1, or 2;

y denotes 0, 1, 2, 3, 4, 5, or 6;

z equals 0 if y equals 0 and z equals 1 if y equals 1 to 6.

In one embodiment of the compounds of formula (IB), $R_1$, $R_2$, $R_3$, $R_4$, $R_5$, $R_6$, $R_7$ and $R_8$ each independently denote $C_1\text{-}C_6$ alkyl. In an alternative embodiment, $R_1$, $R_2$, $R_3$, $R_4$, $R_5$, $R_6$, $R_7$ and $R_8$ in formula (IB) each independently denote $C_1\text{-}C_6$ alkoxy.

In another embodiment of the compounds of formula (IB), $A_1$ and $A_2$ each independently denote a group of formula $—[(CH_2)_y—O]_z—C(O)—CH=CH_2$; $R_1$, $R_2$, $R_3$ and $R_4$ each independently denote $C_1\text{-}C_6$ alkyl; and m, n, o, and p each independently denote 0, 1, or 2. In yet another embodiment, $A_1$ and $A_2$ in formula (IB) each independently denote a group of formula $—[(CH_2)_y—O]_z—C(O)—CH=CH_2$; $R_1$, $R_2$, $R_3$ and $R_4$ each independently denote $C_1\text{-}C_6$ alkoxy; and m, n, o, and p each independently denote 0, 1, or 2.

In another embodiment of the compounds of formula (IB), $A_1$ and $A_2$ each independently denote a group of formula $—C(O)\text{-}D_1\text{-}O—[(CH_2)_y—O]_z—C(O)—CH=CH_2$ and/or of formula $—C(O)\text{-}D_2\text{-}O—[(CH_2)_y—O]_z—C(O)—CH=CH_2$; and $R_1$, $R_2$, $R_3$, $R_4$, $R_5$, $R_6$, $R_7$ and $R_8$ each independently denote $C_1\text{-}C_6$ alkyl. In an alternative embodiment, $A_1$ and $A_2$ in formula (IB) each independently denote a group of formula $—C(O)\text{-}D_1\text{-}O—[(CH_2)_y—O]_z—C(O)—CH=CH_2$ and/or a group of formula $—C(O)\text{-}D_2\text{-}O—[(CH_2)_y—O]_z—C(O)—CH=CH_2$; and $R_1$, $R_2$, $R_3$, $R_4$, $R_5$, $R_6$, $R_7$ and $R_8$ each independently denote $C_1\text{-}C_6$ alkoxy.

In a preferred embodiment, the alkyl and alkoxy groups of $R_1, R_2, R_3, R_4, R_5, R_6, R_7$ and $R_8$ in formulae (I), (IA) and (IB) may comprise 3, 4, 6 or 7 carbon atoms and in particular, 4 or 6 carbon atoms.

Examples of alkyl groups comprising 3 or 4 carbon atoms include isopropyl and butyl. Examples of alkyl groups comprising 6 or 7 carbon atoms include hexyl, 2-methylpentyl, 3-methylpentyl, 2,2-dimethylpentyl, and 2,3-dimethylpentyl.

Examples of alkoxy groups comprising 3 or 4 carbon atoms include isopropoxy, but-1-oxy, but-2-oxy, and tert-butoxy. Examples of alkoxy groups comprising 6 or 7 carbon atoms include hex-1-oxy, hex-2-oxy, hex-3-oxy, 2-methylpent-1-oxy, 2-methylpent-2-oxy, 2-methylpent-3-oxy, 2-methylpent-4-oxy, 4-methylpent-1-oxy, 3-methylpent-1-oxy, 3-methylpent-2-oxy, 3-methylpent-3-oxy, 2,2-dimethylpent-1-oxy, 2,2-dimethylpent-3-oxy, 2,2-dimethylpent-4-oxy, 4,4-dimethylpent-1-oxy, 2,3-dimethylpent-1-oxy, 2,3-dimethylpent-2-oxy, 2,3-dimethylpent-3-oxy, 2,3-dimethylpent-4-oxy, and 3,4-dimethylpent-1-oxy.

The one or more chiral dopant compounds B will usually be present in a total concentration of from about 0.1% to about 30% by weight, e.g., from about 0.1% to about 25%, or from about 0.1% to about 20% by weight, based on the total weight of the composition. For example, in the case of inkjet printing the best results will often be obtained with concentrations of from 3% to 10% by weight, e.g., from 5% to 8% by weight, based on the total weight of the polymer composition. The one or more nematic compounds A will often be present in a concentration of from about 30% to about 50% by weight, based on the total weight of the polymer composition.

A chiral liquid crystal precursor composition will usually comprise a solvent to adjust its viscosity to a value which is suitable for the employed application method. Suitable solvents are known to those of skill in the art. Non-limiting examples thereof include low-viscosity, slightly polar and aprotic organic solvents, such as, e.g., methyl ethyl ketone (MEK), acetone, cyclohexanone, ethyl acetate, ethyl 3-ethoxypropionate, toluene, and mixtures of two or more thereof.

If a chiral liquid crystal precursor composition (comprising one more polymerizable monomers) is to be cured/polymerized by UV radiation the composition will also comprise at least one photoinitiator that shows a non-negligible solubility in the composition. Non-limiting examples of the many suitable photoinitiators include α-hydroxyketones such as 1-hydroxy-cyclohexyl-phenyl-ketone and a mixture (e.g., about 1:1) of 1-hydroxy-cyclohexyl-phenyl-ketone and one or more of benzophenone, 2-hydroxy-2-methyl-1-phenyl-1-propanone, and 2-hydroxy-1-[4-(2-hydroxyethoxy)phenyl]-2-methyl-1-propanone; phenylglyoxylates such as methylbenzoylformate and a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester; benzyldimethyl ketals such as alpha, alpha-dimethoxy-alpha-phenylacetophenone; α-aminoketones such as 2-benzyl-2-(dimethylamino)-1-[4-(4- morpholinyl)phenyl]-1-butanone and 2-methyl-1-[4-(methylthio)phenyl]-2-(4-morpholinyl)-1-propanone; phosphine oxide and phosphine oxide derivatives such as diphenyl (2,4,6-trimethylbenzoyl)-phosphine oxide; phenyl bis(2,4,6-trimethylbenzoyl) supplied by Ciba; and also thioxanthone derivatives such as Speedcure ITX (CAS 142770-42-1), Speedcure DETX (CAS 82799-44-8), Speedcure CPTX (CAS 5495-84-1-2 or CAS 83846-86-0) supplied by Lambson.

If a chiral liquid crystal precursor composition is to be cured by a method which is different from irradiation with UV light such as, e.g., by means of high-energy particles (e.g., electron beams), X-rays, gamma-rays, etc. the use of a photoinitiator can, of course, be dispensed with.

Non-limiting specific examples of chiral dopant compounds B of formula (I) for use in the present invention are as disclosed above.

Additionally, the chiral liquid crystal polymer layer(s) can comprise components, such as disclosed in US 2011/0101088 A1 and WO 2010/115879 A2 and its U.S. National Stage application Ser. No. 13/262,348, (which published as US 2012/0061470 A1), which are incorporated by reference herein in their entireties. The chiral liquid crystal polymer (CLCP) layer(s) can comprise components A) and B), wherein A) is 20-99.5 wt % of at least one three-dimensionally crosslinkable compound of the formula (1)

$$Y^1-A^1-M^1-A^2-Y^2 \quad (1)$$

wherein $Y^1$, $Y^2$ are equal or different, and represent polymerizable groups;

$A^1$, $A^2$ are equal or different residues of the general formula $C_nH_{2n}$, wherein n is an integer between 0 and 20, and wherein at least one methylene group may be replaced by an oxygen atom;

$M^1$ has the formula $—R^1—X^1—R^2—X^2—R^3—X^3—R^4—$;

wherein $R^1$ to $R^4$ are equal or different bivalent residues chosen from the group consisting of —O—, —COO—, —COHN—, —CO—, —S—, —C=C—, CH—CH—, —N=N—, —N=N(O)—, and a C—C bond; and wherein $R^2—X^2—R^3$ or $R^2—X^2$ or $R^2—X^2—R^3—X^3$ may as well be a C—C bond;

$X^1$ to $X^3$ are equal or different residues chosen from the group consisting of 1,4-phenylene; 1,4-cyclohexylene; heteroarylenes having 6 to 10 atoms in the aryl core and 1 to 3 heteroatoms from the group consisting of O, N and S, and carrying substituents $B^1$, $B^2$ and/or $B^3$; cycloalkylenes having 3 to 10 carbon atoms and carrying substituents $B^1$, $B^2$ and/or $B^3$;

wherein $B^1$ to $B^3$ are equal or different substituents chosen from the group consisting of hydrogen, $C_1$-$C_{20}$-alkoxy, $C_1$-$C_{20}$-alkylthio, $C_1$-$C_{20}$-alkylcarbonyl, alkoxycarbonyl, $C_1$-$C_{20}$-alkylthiocarbonyl, —OH, —F, —Cl, —Br, —I, —CN, —NO$_2$, Formyl, Acetyl, and alkyl-, alkoxy-, or alkylthio-residues with 1 to 20 carbon atoms having a chain interrupted by ether oxygen, thioether, sulfur or ester groups; and B) is 0.5 to 80 wt % of at least one chiral compound of the formula (2)

$$V^1-A^1-W^1—Z—W^2-A^2-V^2 \quad (2)$$

wherein $V^1$, $V^2$ are equal or different and represent a residue of the following: acrylate, methacrylate, epoxy, vinyl ether, vinyl, isocyanate, $C_1$-$C_{20}$-alkyl, $C_1$-$C_{20}$-alkoxy, alkylthio, $C_1$-$C_{20}$-alkylcarbonyl, $C_1$-$C_{20}$-alkoxycarbonyl, $C_1$-$C_{20}$-alkylthiocarbonyl, —OH, —F, —Cl, —Br, —I, —CN, —NO$_2$, formyl, acetyl, as well as alkyl-, alkoxy-, or alkylthio-residues with 1 to 20 carbon atoms having a chain interrupted by ether oxygen, thioether sulfur or ester groups, or a cholesterol residue;

$A^1$, $A^2$ are as indicated above;

$W^1$, $W^2$ have the general formula $—R^1—X^1—R^2—X^2—R^3—$, wherein $R^1$ to $R^3$ are as indicated above, and wherein $R^2$ or $R^2—X^2$ or $X^1—R^2—X^2—R^3$ may also be a C—C bond;

$X^1$, $X^2$ are as indicated above;

Z is a divalent chiral residue chosen from the group consisting of dianhydrohexites, hexoses, pentoses, binaphthyl derivatives, biphenyl derivatives, derivatives of tartaric acid, and optically active glycols, and a C—C bond in the case where $V^1$ or $V^2$ is a cholesterol residue.

The component B) can be selected from at least one of AnABIs-(2-[4-(acryloyloxy)-benzoyl]-5-(4-methoxybenzoyl)-isosorbid), DiABIs (di-2,5-[4-(acryloloxy)-benzoyl]-isosorbid), and DiABIm (di-2,5[(4'-acryloyloxy)-benzoyl]-isomannid).

The CLCP flakes can further comprise an additional layer made with luminescent and/or magnetic material.

The additional layer made with luminescent and/or magnetic material can comprise a magnetic material, and the magnetic material can comprise at least one material selected from ferromagnetic materials, ferrimagnetic materials, paramagnetic materials, and diamagnetic materials. For example, the magnetic material can comprise at least one material selected from metals and metal alloys comprising at least one of iron, cobalt, nickel, and gadolinium. For example, the magnetic material can comprise, without limitation, an alloy of iron, cobalt, aluminum, and nickel (with or without copper, niobium, and/or tantalum), such as Alnico, or an alloy of titanium, nickel, cobalt, aluminum, and iron, such as Ticonal; ceramics; and ferrites. The magnetic material can also comprise at least one material selected from inorganic oxide compounds, ferrites of formula MFe$_2$O$_4$ wherein M represents Mg, Mn, Co, Fe, Ni, Cu or Zn, and garnets of formula A$_3$B$_5$O$_{12}$ wherein A represents La, Ce, Pr, Nd, Sm, Eu, Gd, Tb, Dy, Ho, Er, Tm, Yb, Lu or Bi and B represents Fe, Al, Ga, Ti, V, Cr, Mn or Co. The magnetic material comprises at least one of a soft magnetic material and a hard magnetic material.

The additional layer made with luminescent and/or magnetic material can comprise a luminescent material comprising one or more lanthanide compounds. The luminescent material can comprise at least one complex of a lanthanide and a β-diketo compound.

The additional layer made with luminescent and/or magnetic material can comprise at least one magnetic material and at least one lanthanide compound. The additional layer made with luminescent and/or magnetic material can comprise at least one magnetic material and at least one complex of a lanthanide and a β-diketo compound.

The CLCP flakes can be visible and/or invisible to the unaided eyes.

The distribution of flakes can comprise different types of flakes. The distribution of flakes can comprise at least two different sizes of flakes and/or two different aspect ratios of flakes. The different types of flakes can include flakes having the same color-shift properties, or flakes having different color-shift properties. For example, the different types of flakes can have the same color shift properties and different polarization properties. The different types of flakes can be in the visible range of the electromagnetic spectrum, or in the invisible range of the electromagnetic spectrum.

The position of a selective reflection band exhibited by the flakes can be the same or different. The difference between the position of a selective reflection band can be at least 10 nm, or at least 20 nm, or at least 30 nm, or in a range of from 20 nm to 100 nm.

The position of a selective reflection band exhibited by said flakes can be comprised between 400 nm and 1200 nm.

The flakes can be distributed randomly.

The flakes can have the same or different circular polarization properties.

The flakes, such as the flakes at least partially overlapping the code, preferably the mono-dimensional and/or bidimensional code, can be dispersed in a binder. The binder can be the same as the modifying resin used in the modifying resin layer, which will be described below. Thus, the binder can be a resin (also called modifying resin) which is able to change the position of the selective reflection band exhibited by a chiral liquid crystal polymer layer in contact with said resin, the chiral liquid crystal polymer layer (called salt-containing chiral liquid crystal polymer layer) being made from a chiral liquid crystal precursor composition comprising at least one salt that changes (usually in a concentration-dependent manner) the position of a selective reflection band ($\lambda$max) exhibited by the chiral liquid crystal polymer layer, compared to the position of the selective reflection band exhibited by a chiral liquid crystal polymer layer that does not contain the at least one salt. Thus, the resin (also called modifying resin) changes the position of the selective reflection band exhibited by the salt-containing chiral liquid crystal polymer layer. It is thus possible to get a salt-containing chiral liquid crystal layer that is locally modified by a modifying resin.

The modifying resin may shift the position of the selective reflection band exhibited by the salt-containing chiral liquid crystal polymer layer by at least 5 nm, preferably at least 10 nm, more preferably at least 20 nm, and/or may shift the position to shorter wavelengths and/or the shifted position of the selective reflection band may be in the visible range. In this regard, it is noted that "shifting the position of the selective reflection band" means shifting $\lambda_{max}$ as measured using an analytical spectral device that measures the reflectance of a sample in the infrared-near-infrared-visible-UV range of the spectrum, such as the LabSpec Pro device made by Analytical Spectral Devices Inc. of Boulder, Colo.

The modifying resin may have been provided by at least one of continuous ink-jet printing, drop-on-demand ink-jet printing, valve-jet printing, spray coating, flexography, gravure printing, offset, dry offset printing, letterpress printing, pad printing and screen printing.

At least one or more polymerizable monomers can be used to provide the modifying resin for changing the position of the selective reflection band exhibited by the cured chiral liquid crystal precursor composition. The at least one or more polymerizable monomers may comprise at least two unsaturated carbon-carbon bonds and/or at least one of the one or more polymerizable monomers may comprise at least one heteroatom, preferably selected from O, N and S and in particular, O and/or N. For example, at least one of the one or more polymerizable monomers for providing the modifying resin may comprise one or more groups (e.g., one, two, three, four, five, six, or more groups) of formula $H_2C=CH-C(O)-$ or $H_2C=C(CH_3)-C(O)-$. Non-limiting examples of corresponding monomers include polyether acrylates, modified polyether acrylates (such as, e.g., amine-modified polyether acrylates), polyester acrylates, modified polyester acrylates (such as, e.g., amine-modified polyester acrylates), hexafunctional polyester acrylates, tetrafunctional polyester acrylates, aromatic difunctional urethane acrylates, aliphatic difunctional urethane acrylates, aliphatic trifunctional urethane acrylates, aliphatic hexafunctional urethane acrylates, urethane monoacrylates, aliphatic diacrylates, bisphenol A epoxy acrylates, modified bisphenol A epoxy acrylates, epoxy acrylates, modified epoxy acrylates (such as, e.g., fatty acid modified epoxy acrylates), acrylic oligomers, hydrocarbon acrylate oligomers, ethoxylated phenol acrylates, polyethylene glycol diacrylates, propoxylated neopentyl glycol diacrylates, diacrylated bisphenol A derivatives, dipropylene glycol diacrylates, hexanediol diacrylates, tripropylene glycol diacrylates, polyether tetraacrylates, ditrimethylol propane tetraacrylates, dipentaerythritol hexaacrylates, mixtures of pentaerythritol tri- and tetraacrylates, dipropylene glycol diacrylates, hexanediol diacrylates, ethoxylated trimethylol propane triacrylates, and tripropylene glycol diacrylates. Another type of resin that can be used are aqueous resins such as polyamide resins, for example CAS No 175893-71-7, CAS No 303013-12-9, CAS No 393802-62-5, CAS No 122380-38-5, CAS No 9003-39-8.

The modifying resin may comprise a radiation-cured resin, for example, a UV-cured resin. Alternatively, the modifying resin may comprise an aqueous resin which may be dried, such as by conventional means such as heat.

The one or more salts of the chiral liquid crystal layer may comprise a metal such as, e.g., an alkali metal and/or an alkaline earth metal. For example, the metal may be selected from one or both of Li and Na.

The modifying resin layer can contain the modifying resin as discussed above. The modifying resin for changing the position of the selective reflection band exhibited by the salt-containing chiral liquid crystal layer may comprise a radiation-cured resin, for example, a UV-cured resin. Another type of resin that can be used in the present invention are aqueous resins, such as polyamide resins, for example CAS No 175893-71-7, CAS No 303013-12-9, CAS No 393802-62-5, CAS No 122380-38-5, CAS No 9003-39-8.

The salt that changes the position of the selective reflection band exhibited by the salt-containing chiral liquid crystal layer may be selected from metal salts and (preferably quaternary) ammonium salts. For example, the at least one salt may comprise at least one salt of a metal such an alkali or alkaline earth metal (e.g., Li, Na), for example, one or more of lithium perchlorate, lithium nitrate, lithium tetrafluoroborate, lithium bromide, lithium chloride, sodium carbonate, sodium chloride, sodium nitrate, and/or one or more (organically substituted) ammonium salts such as tetraalkylammonium salts, for example, one or more of tetrabutylammonium perchlorate, tetrabutylammonium chloride, tetrabutylammonium tetrafluoroborate, and tetrabutylammonium bromide.

Reference is also made herein to U.S. Pat. Nos. 8,426,011, 8,426,012, 8,426,013 and 8,426,014 for various materials that can be used in the present marking, including modifying resins, modifying agents, chiral liquid crystal compounds, etc., the disclosures of which are incorporated by reference herein in their entireties.

Moreover, as noted above, the marking can be formed directly on the item or good upon which the indicia, preferably code, is contained. Moreover, the marking can also be formed by providing the label member that can be affixed on the item or good at least partially over the indicia, preferably code.

The distribution of flakes can be provided by at least one of printing, coating or bronzing with a liquid, semi-solid or solid composition that comprises the flakes.

The modifying resin for use in the present invention is not particularly limited as long as it is capable of changing the position of the selective reflection band exhibited by a salt-containing chiral liquid crystal layer. In this regard, it is preferred for the resin to be capable of shifting the position of the selective reflection band by at least about 5 nm, e.g., by at least about 10 nm, by at least about 20 nm, by at least about 30 nm, by at least about 40 nm, or by at least about 50 nm. This capability depends on various factors such as, inter alia, the components of the salt-containing chiral liquid crystal precursor composition, for example, the salt(s) and the chiral dopant(s) comprised therein, and the presence or absence of functional groups in the modifying resin (and thus on the surface thereof).

Examples of modifying resins which are suitable include those made from (one, two, three, four or more) polymerizable monomers which include one or more (e.g., two or three) heteroatoms selected from, e.g., O, N, or S. In this regard, it is to be appreciated that the polymerizable monomers are not limited to those which are polymerizable by free radical polymerization. Rather, these monomers also include, for example, monomers which are polymerizable by cationic and/or anionic polymerization and/or by polycondensation. Accordingly, non-limiting examples of resins which are suitable for the purposes of the present invention include organic resins such as polyacrylates, polymethacrylates, polyvinylethers, polyvinylesters, polyesters, polyethers, polyamides, polyurethanes, polycarbonates, polysulfones, phenolic resins, epoxy resins, and mixed forms of these resins. Mixed inorganic/organic resins such as silicones (e.g., polyorganosiloxanes) are suitable as well. One particular type of resin that can be used in the present invention are aqueous resins such as, e.g., polyamide resins (for example CAS No 175893-71-7, CAS No 303013-12-9, CAS No 393802-62-5, CAS No 122380-38-5, CAS No 9003-39-8).

Non-limiting examples of modifying resins further include those which are made from one or more monomers selected from polyether acrylates, modified polyether acrylates (such as, e.g., amine-modified polyether acrylates), polyester acrylates, modified polyester acrylates (such as, e.g., amine-modified polyester acrylates), hexafunctional polyester acrylates, tetrafunctional polyester acrylates, aromatic difunctional urethane acrylates, aliphatic difunctional urethane acrylates, aliphatic trifunctional urethane acrylates, aliphatic hexafunctional urethane acrylates, urethane monoacrylates, aliphatic diacrylates, bisphenol A epoxy acrylates, modified bisphenol A epoxy acrylates, epoxy acrylates, modified epoxy acrylates (such as, e.g., fatty acid modified epoxy acrylates), acrylic oligomers, hydrocarbon acrylate oligomers, ethoxylated phenol acrylates, polyethylene glycol diacrylates, propoxylated neopentyl glycol diacrylates, diacrylated bisphenol A derivatives, dipropylene glycol diacrylates, hexanediol diacrylates, tripropylene glycol diacrylates, polyether tetraacrylates, ditrimethylol propane tetraacrylates, dipentaerythritol hexaacrylates, mixtures of pentaerythritol tri- and tetraacrylates, dipropylene glycol diacrylates, hexanediol diacrylates, ethoxylated trimethylol propane triacrylates, and tripropylene glycol diacrylates (optionally in combination with one or more monomers which are different from the above monomers).

It is to be appreciated that a modifying resin does not have to be completely cured (polymerized) or dry before it is contacted with a salt-containing chiral liquid crystal precursor composition as long as it is able to withstand the components and in particular, the solvent that may be (and usually will be) present in the (uncured) salt-containing chiral liquid crystal precursor composition (e.g., that the modifying resin does not get dissolved thereby to any significant extent). The curing of an only partially cured modifying resin may be completed, for example, together with the curing of the salt-containing chiral liquid crystal precursor (e.g., by UV-radiation).

Another great advantage over the existing prior art (as illustrated in, e.g., WO 2001/024106, WO 2008/127950, the entire disclosures of which are incorporated by reference herein) is the possibility to create perfect register without using mask techniques. By perfect register it is meant the possibility to have in very few steps and/or process(es) steps a single layer of liquid crystal polymer wherein two or more zones with simultaneously different color shifting properties and/or different positions of the selective reflection band are present, and these zones can be perfectly adjacent without either a gap or an overlap between them. This advantage stems from the fact that the liquid crystal precursor composition is applied in one step, and its properties are locally modified by the modifying resin. To obtain a similar result without the instant method, one would have to apply and cure two or more liquid crystal precursor compositions in successive steps with excessively high precision in order for them to cover adjacent regions without gaps or overlaps. The instant method allows straightforward creation of logo, marking, coding, barcode, pattern, data matrix which contains different information and/or color at the same time. The possibilities afforded by the instant method include using mixtures of modifying resins (e.g., mixtures of two, three, four or more modifying resins), both in the form of cured physical mixtures of two or more modifying resins and in the form of two or more different modifying resins which are (separately) present on different locations of the surface of the substrate. Alternatively or additionally, two or more different chiral liquid crystal precursor compositions which differ, for example, in the concentration of salt(s) contained therein and/or differ by containing different salts therein may also be used. This gives rise to a large number of possible combinations of chiral liquid crystal precursor compositions and modifying resins which may be present on the surface of a single substrate. This large number of possible combinations allows, among others, the possibility of creating a specific code and/or marking which is difficult to counterfeit because anyone who wants to reproduce it would have to know the exact composition of the chiral liquid crystal precursor composition, the type, amount, and concentration of salt(s) contained therein and the nature of the modifying resin(s). The incorporation of additional specific security elements such as, e.g., near-infrared, infrared and/or UV security elements (known exclusively to the producer of the marking) into the liquid crystal precursor composition and/or into the modifying resin, makes counterfeiting even more difficult. Accordingly, the present invention also contemplates and encompasses the use of chiral liquid crystal precursor compositions and modifying resins which comprise such additional specific security elements.

The marking of the present invention offers a number of advantages. For example, the fundamentally different nature of its components—printable code made with, e.g., a black ink and layer of CLCP material—and the information provided thereby results in a quasi synergistic combination where the information provided by the printable code is enhanced by the CLCP layer covering it (or at least a part thereof) and the information provided by the CLCP layer is enhanced by the printable code underneath it. In other words, the printable code adds to the complexity of the CLCP layer and the CLCP layer adds information beyond the information provided by the printable code alone. For example, the CLCP layer of the marking can be validated with a mobile phone without the need of using a separate external device because instead of observing the CLCP layer under two different angles it is now possible to observe the CLCP layer under only one angle and to retrieve the required supplemental information from the printable code (e.g., by scanning the digital information with the camera of the mobile phone).

The provision of one or more of the optional elements set forth above enhances the security provided by the marking of the present invention even further. For example, the modification of the optical (spectral) properties of the CLCP layer by a modifying composition or a modifying resin in one or more parts of the CLCP layer increases the complexity of the CLCP layer and the marking as whole. Further, including randomly distributed CLCP flakes in the CLCP layer or a separate layer underneath it makes reproduction of the marking by conventional reproduction means such as copying machines virtually impossible because the specular reflections of the CLCP layer and the CLCP flakes are different and cannot be reproduced by a simple copying process.

The following example is intended to illustrate the invention without restricting it.

EXAMPLE

A marking is provided on a substrate made of, e.g., paper or a polymer by first providing (e.g., by printing) a black rectangle (size 20 mm×25 mm) of IR transparent ink on the substrate.

On the black rectangle of IR transparent ink a cloud of dots is provided (e.g., by ink-jet printing) with a classic carbon black ink and/or an IR absorbent ink. The size (diameter) of the dots is from about 30 μm to about 50 μm. The dots are printed in predetermined positions of the rectangle to represent a binary code. The cloud of dots (which represents a binary code or an information) is readable with a smartphone comprising software that enables the smartphone to distinguish one dot or a group of dots from other dots/groups of dots and to display information relating to the position of the dot(s).

Following the provision of the printed binary code thereon, the black rectangle of IR transparent ink is covered with a (pigmented) layer of a transparent UV-curable resin composition that contains CLCP flakes, followed by curing the resin with UV radiation. The resin composition may be applied by, e.g., a serigraphy printing technique. Two typical resin compositions which are suitable for this purpose are shown below (all percentages are by weight):

| Base Formula | | Ink 0.2% | Ink 3% |
|---|---|---|---|
| Oligomers | 50% | | |
| Monomers | 30% | | |
| Silica (Aerosil ® 200) | 3% | | |
| Ink vehicle | | 85% | 85% |
| Photoinitiator | | 5% | 5% |

| Base Formula | Ink 0.2% | Ink 3% |
|---|---|---|
| Additives | 6.6% | 6% |
| CLCP flakes | 0.2% | 3% |
| Pigments | 0.2% | 1% |
| Total | 100% | 100% |

The cured transparent layer of UV-curable resin having CLCP flakes randomly distributed therein is then covered with a CLCP layer. The polymer of the CLCP layer differs from the polymer of the CLCP flakes in the transparent layer of UV-cured resin with respect to at least one optical property. The CLCP precursor composition is applied by, e.g., ink-jet printing, followed by heating (to remove optionally present solvent and to promote the chiral liquid crystal state), and thereafter curing the layer with UV radiation. A typical CLCP precursor composition which is suitable for this purpose is shown below (percentages are by weight):

| | |
|---|---|
| Methyl ethyl ketone | 55.7% |
| benzoic acid 4-[4-[(1-oxo-2-propenyl)oxy] butoxycarboxy]-, 2-methyl-1,4-phenylene ester | 40.1% |
| (3R,3aR,6S,6aR)-hexahydrofuro[3,2-b]furan-3,6-diyl bis(4-(acryloyloxybutoxy)benzoate) | 1.70% |
| Photoinitiator (Irgacure 907) | 1.30% |
| $KPF_6$ | 1.20% |

Despite the presence of the two layers (UV-curable resin and CLCP) arranged above it, the code of black ink in the final marking can be read by a classical smartphone with a dedicated software reader. However, attempts to scan or photocopy the marking with the printed binary code therein are unsuccessful.

It is noted that the foregoing example has been provided merely for the purpose of explanation and is in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A marking for an article, item or substrate, the marking comprising:
    a printable code,
    at least a part of the printable code is covered by a transparent intermediate layer including randomly distributed therein at least flakes comprising a chiral liquid crystal polymer (CLCP) material;
    a CLCP layer, the CLCP layer at least partially covering the transparent intermediate layer and at least partially covering the printable code;
    the CLCP material in the transparent intermediate layer has at least one optical property that is different from an optical property of the CLCP layer; and wherein the CLCP layer is made from a precursor composition that comprises at least one nematic compound, at least one chiral dopant, and at least one photoinitiator.

2. The marking according to claim 1, wherein the printable code comprises one or more of cells, dots, microdots, bars, micro alphanumeric characters, and glyphs.

3. The marking according to claim 1, wherein the printable code comprises one or more of a cloud of dots, a sum of glyphs, a 1-dimensional barcode, a stacked 1-dimensional barcode, a 2-dimensional barcode, and a data matrix.

4. The marking according to claim 1, wherein the printable code comprises a black ink.

5. The marking according to claim 4, wherein the black ink comprises IR transparent black ink and/or IR absorbent black ink.

6. The marking according to claim 1, wherein at least a part of the printable code is formed by an IR absorbent black ink and/or a carbon black ink and at least a part of the code formed by the IR absorbent black ink and/or the carbon black ink is covered by an IR transparent black ink.

7. The marking according to claim 1, wherein at least a part of the printable code is formed by an IR absorbent black ink and/or a carbon black ink and at least a part of the printable code is provided on a background formed by an IR transparent black ink.

8. The marking according to claim 1, wherein the CLCP layer is made from a precursor composition that further comprises at least one solvent.

9. The marking according to claim 1, wherein the CLCP layer is visible to an unaided eye.

10. The marking according to claim 1, wherein the CLCP layer has a modified optical property in at least one area thereof.

11. The marking according to claim 1, wherein the CLCP layer has randomly distributed therein flakes comprising a CLCP material that has at least one optical property that is different from an optical property of the CLCP layer.

12. The marking according to claim 11, wherein the flakes in the CLCP layer have an average size of from 20 μm to 100 μm.

13. The marking according to claim 11, wherein the flakes in the CLCP layer have an at least bimodal particle size distribution.

14. The marking according to claim 11, wherein at least a part of the flakes in the CLCP layer is visible to the unaided eye.

15. The marking according to claim 11, wherein at least a part of the flakes in the CLCP layer is invisible to the unaided eye.

16. The marking according to claim 1, wherein the at least one intermediate layer comprises a UV cured resin.

17. A substrate which has the marking according to claim 1 on at least one surface thereof.

18. The substrate according to claim 17, wherein a cured resin layer is present between the substrate and the printable code, the resin layer modifying at least one optical property of the CLCP layer in areas thereof that are not covered by an ink of the printable code.

19. The substrate according to claim 17, wherein a second CLCP layer is present between the substrate and the printable code, the second CLCP layer having at least one optical property that is different from an optical property of the CLCP layer that covers at least a part of the printable code.

20. An article or item that comprises the marking according to claim 1.

21. The article or item of claim 20, wherein the article or item is or comprises at least one of a label, packaging, a cartridge, a container or a capsule that contains foodstuffs, nutraceuticals, pharmaceuticals, or beverages, a banknote, a credit card, a stamp, a tax label, a security document, a passport, an identity card, a driver's license, an access card, a transport ion ticket, an event ticket, a voucher, an ink-transfer layer, a reflective layer, an aluminum foil, a semiconductor, and a commercial good.

22. A method of at least one of identifying, authenticating, tracking, and tracing an article or item, comprising retrieving information from at least the printable code of the marking according to claim 1 on the article or item, and comparing the retrieved information with previously stored information.

23. The method of claim 22, wherein the information is retrieved by a camera of a mobile phone.

24. A method of marking an article or item, the method comprising providing at least one surface of the article or item with a printable code;
covering at least a part of the printable code with a transparent intermediate layer including randomly distributed therein at least flakes comprising a chiral liquid crystal polymer (CLCP) material;
at least partially covering the transparent intermediate layer and at least partially covering the printable code with a CLCP layer made from a precursor composition that comprises at least one nematic compound, at least one chiral dopant, and at least one photoinitiator; and
the CLCP material in the transparent intermediate layer having at least one optical property that is different from an optical property of the CLCP layer.

25. A method of increasing the complexity and/or reducing the reproducibility of a printable code, comprising covering at least a part of the printable code with a transparent intermediate layer including randomly distributed therein at least flakes comprising a chiral liquid crystal polymer (CLCP) material;
at least partially covering the transparent intermediate layer and at least partially covering the printable code with a CLCP layer made from a precursor composition that comprises at least one nematic compound, at least one chiral dopant, and at least one photoinitiator; and
the CLCP material in the transparent intermediate layer having at least one optical property that is different from an optical property of the CLCP layer.

* * * * *

UNITED STATES PATENT AND TRADEMARK OFFICE
CERTIFICATE OF CORRECTION

PATENT NO. : 9,579,922 B2  
APPLICATION NO. : 14/326982  
DATED : February 28, 2017  
INVENTOR(S) : E. Decoux et al.

Page 1 of 1

It is certified that error appears in the above-identified patent and that said Letters Patent is hereby corrected as shown below:

In the Claims

Column 44, Line 16 (Claim 21, Line 7) please change "a transport ion" to -- a transportation --

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*